US012791534B2

(12) United States Patent
Scanlon et al.

(10) Patent No.: US 12,791,534 B2
(45) Date of Patent: Nov. 10, 2026

(54) CHROMATOGRAPHY COLUMN ADAPTERS WITH FACE SEALS FOR INTERFACING WITH CLAMPING FLUIDIC CONNECTORS

(71) Applicant: Waters Technologies Corporation, Milford, MA (US)

(72) Inventors: Michael Scanlon, Sharon, MA (US); Wade P. Leveille, Douglas, MA (US); Joseph D. Michienzi, Plainville, MA (US)

(73) Assignee: Waters Technologies Corporation, Milford, MA (US)

( * ) Notice: Subject to any disclaimer, the term of this patent is extended or adjusted under 35 U.S.C. 154(b) by 282 days.

(21) Appl. No.: 18/598,803

(22) Filed: Mar. 7, 2024

(65) Prior Publication Data

US 2024/0302335 A1 Sep. 12, 2024

Related U.S. Application Data

(60) Provisional application No. 63/450,725, filed on Mar. 8, 2023.

(51) Int. Cl.
*G01N 30/60* (2006.01)
*B01D 15/10* (2006.01)
(Continued)

(52) U.S. Cl.
CPC ......... *G01N 30/6026* (2013.01); *B01D 15/10* (2013.01); *F16L 19/00* (2013.01); *G01N 2030/027* (2013.01)

(58) Field of Classification Search
CPC ........ G01N 30/02; G01N 30/06; G01N 30/88; G01N 2030/027; G01N 30/34;
(Continued)

(56) References Cited

U.S. PATENT DOCUMENTS 4,563,275 A * 1/1986 McEachern ............ G01N 30/56 D24/232
4,619,473 A 10/1986 Someya
(Continued)

FOREIGN PATENT DOCUMENTS

CN 120019275 A * 5/2025 ......... G01N 30/6026
DE 102019212150 A1 * 2/2021 ......... G01N 30/6026
(Continued)

OTHER PUBLICATIONS

International Search Report and Written Opinion for International Patent Application No. PCT/US2024/018897, mailed Jul. 23, 2024.
(Continued)

*Primary Examiner* — Andre J Allen
(74) *Attorney, Agent, or Firm* — Goodwin Procter LLP

(57) ABSTRACT

Threaded conventional column end fittings for liquid chromatography columns do not have face seals that enable them to be used with clamping fluidic connectors. The exemplary embodiments may provide adapters that interface with conventional threaded column end fittings so that the column assembly may now be used with the clamping fluidic connectors. The adapters of the exemplary embodiments may include lock nuts for securing the adapters to column end fittings of a liquid chromatography columns. The lock nuts may include threads that bear the load of the adapter rather than the column end fitting of the chromatography column. The threads of the lock nut become the load bearing surfaces, and the load is distributed over the surfaces where the threads of the adapter engage with the threads of the lock nut.

15 Claims, 18 Drawing Sheets

(51) Int. Cl.
*F16L 19/00* (2006.01)
*G01N 30/02* (2006.01)

(58) Field of Classification Search
CPC .. G01N 30/74; G01N 30/32; G01N 2030/025; G01N 30/72; G01N 30/30; G01N 30/96; G01N 30/20; G01N 2030/062; G01N 30/56; G01N 30/90; G01N 30/6004; G01N 2030/324; G01N 30/24; G01N 30/60; G01N 30/14; G01N 30/7233; G01N 30/6095; G01N 30/461; G01N 30/16; G01N 30/6026; G01N 30/6017; G01N 33/558; G01N 30/463; G01N 30/8679; G01N 30/6052; G01N 30/38; G01N 30/466; G01N 30/6021; G01N 2030/326; G01N 30/603; G01N 30/6047; G01N 30/8675; G01N 30/6091; G01N 30/8658; G01N 2030/201; G01N 30/36; G01N 2030/884; G01N 30/54; G01N 2030/202; G01N 2030/8831; G01N 30/7266; G01N 30/12; G01N 30/7206; G01N 2030/047; G01N 2030/8813; G01N 30/468; G01N 2030/565; G01N 30/94; G01N 2030/965; G01N 30/86; G01N 30/6039; G01N 30/64; G01N 2030/8804; G01N 30/8631; G01N 30/08; G01N 2030/522; G01N 30/50; G01N 30/68; G01N 30/52; G01N 2030/045; G01N 33/6848; G01N 30/465; G01N 2030/067; G01N 2030/3007; G01N 2030/085; G01N 30/84; G01N 2030/562; G01N 30/04; G01N 30/42; G01N 30/8634; G01N 2030/8881; G01N 30/6069; G01N 30/62; G01N 2030/207; G01N 30/95; G01N 30/8693; G01N 2030/347; G01N 30/89; G01N 30/26; G01N 30/78; G01N 2030/146; G01N 30/46; G01N 30/82; G01N 33/54388; G01N 2030/065; G01N 30/6034; G01N 30/606; G01N 30/80; G01N 2030/3084; G01N 2030/889; G01N 30/22; G01N 2030/328; G01N 2030/8809; G01N 30/8686; G01N 30/18; G01N 2030/528; G01N 30/00; G01N 30/8665; G01N 30/10; G01N 33/577; G01N 2030/042; G01N 30/6043; G01N 30/92; G01N 30/28; G01N 33/6854; G01N 35/1097; G01N 30/6078; G01N 2030/567; G01N 30/8651; G01N 2030/8854; G01N 30/40; G01N 33/533; G01N 30/93; G01N 33/543; G01N 30/6065; G01N 2030/121; G01N 2030/8822; G01N 30/8624; G01N 1/405; G01N 30/58; G01N 21/05; G01N 30/462; G01N 33/531; G01N 33/6803; G01N 30/6082; G01N 30/8668; G01N 30/91; G01N 33/56983; G01N 2030/524; G01N 2030/009; G01N 30/44; G01N 21/33; G01N 2030/385; G01N 2030/3046; G01N 33/68; G01N 2030/3076; G01N 2030/3061; G01N 2030/885; G01N 33/538; G01N 33/54306; G01N 2030/525; G01N 2030/628; G01N 33/54313; G01N 30/66; G01N 33/54393; G01N 2030/8827; G01N 30/8696; G01N 2030/623; G01N 2030/126; G01N 2030/626; G01N 33/54353; G01N 2030/6013; G01N 2030/386; G01N 2030/3015; G01N 2030/8886; G01N 2030/8836; G01N 2030/402; G01N 1/40; G01N 2030/8872; G01N 2030/122; G01N 2030/527; G01N 33/54346; G01N 2030/8877; G01N 2030/167; G01N 2030/645; G01N 30/8617; G01N 33/54387; G01N 2030/342; G01N 1/34; G01N 2030/746; G01N 33/582; G01N 2030/3053; G01N 2030/3023; G01N 2030/0383; G01N 33/532; G01N 33/6851; G01N 30/8641; G01N 33/566; G01N 2030/127; G01N 2030/8417; G01N 33/2823; G01N 2030/125; G01N 2030/8411; G01N 2030/3038; G01N 2030/381; G01N 27/62; G01N 33/28; G01N 2030/008; G01N 27/44747; G01N 30/467; G01N 33/5308; G01N 2030/387; G01N 33/53; G01N 33/6845; G01N 33/15; G01N 33/54373; G01N 2030/128; G01N 2030/625; G01N 30/70; G01N 2030/642; G01N 1/28; G01N 2021/0346; G01N 21/8483; G01N 21/6428; G01N 30/6086; G01N 30/6073; G01N 2030/285; G01N 2560/00; G01N 30/8662; G01N 2030/143; G01N 30/8644; G01N 21/64; G01N 35/1095; G01N 21/78; G01N 27/66; G01N 2030/205; G01N 33/94; G01N 21/01; G01N 2030/0095; G01N 35/10; G01N 2001/2229; G01N 33/587; G01N 1/44; G01N 2030/945; G01N 30/8637; G01N 2030/322; G01N 30/8682; G01N 35/00732; G01N 1/38; G01N 2030/8494; G01N 33/02; G01N 2030/204; G01N 33/442; G01N 2030/303; G01N 2030/8435; G01N 30/8606; G01N 2030/906; G01N 1/4055; G01N 2030/847; G01N 21/31; G01N 27/622; G01N 33/54366; G01N 33/52; G01N 33/6842; G01N 33/6893; G01N 33/92; G01N 33/545; G01N 33/56911; G01N 33/58; G01N 2030/8859; G01N 30/8672; G01N 2030/8429; G01N 27/44721; G01N 2030/208; G01N 2030/405; G01N 2030/8818; G01N 2030/185; G01N 33/6806; G01N 35/00623; G01N 2030/587; G01N 21/6486; G01N 27/623; G01N 21/6402; G01N 27/447; G01N 33/54386; G01N 2030/521; G01N 2030/6008; G01N 27/626; G01N 21/65; G01N 27/64; G01N 2440/38; G01N 33/585; G01N 2030/165; G01N 2030/8868; G01N 21/85; G01N 1/2214; G01N 33/44; G01N 35/1004; G01N 21/658; G01N 27/624; G01N 33/493; G01N 35/0099; G01N 1/14; G01N 2035/00495; G01N 30/7273; G01N 2001/4061; G01N 30/724; G01N 30/8603; G01N 33/54326; G01N 35/04; G01N 21/53; G01N 33/74; G01N 27/22; G01N 35/1011; G01N 2030/388; G01N 21/4133; G01N 35/1079; G01N 2035/0441; G01N 30/8689; G01N 2030/407; G01N 2035/00524; G01N 33/721; G01N 1/22; G01N 33/00; G01N 33/497; G01N 33/743; G01N 33/82; G01N 2469/10; G01N 30/7253; G01N 33/723; G01N 2030/123; G01N 33/5302; G01N 35/028; G01N 2013/006; G01N 2030/8423; G01N 2333/11; G01N 2469/20; G01N 35/00; G01N 2030/8447; G01N 33/553; G01N 33/56916; G01N 2030/8845; G01N 21/3504; G01N 21/359; G01N 21/645; G01N 2333/165; G01N 33/50; G01N 33/573; G01N 33/6809; G01N 33/72; G01N 21/6408; G01N 27/44717; G01N 27/4473; G01N 33/48; G01N 15/0205; G01N 2030/8405; G01N 33/2829; G01N 33/588; G01N 21/84; G01N 30/728; G01N 35/00584; G01N 2030/022; G01N 2030/445; G01N 2800/52; G01N 35/025; G01N 2001/4033; G01N 2021/6439; G01N 2030/3069; G01N 2030/582; G01N 21/47; G01N 2400/00; G01N 30/76; G01N 33/80; G01N 1/4077; G01N 2030/77; G01N 2570/00; G01N 30/8627; G01N 15/02; G01N 2030/8441; G01N 21/03; G01N 21/25; G01N 30/7213; G01N 33/564; G01N 35/109; G01N 15/075; G01N 2035/00198; G01N 21/07; G01N 21/76; G01N 2333/4737; G01N 33/76; G01N 2333/805; G01N 24/08; G01N 1/4044; G01N 2030/0035; G01N 2030/621; G01N 27/18; G01N 31/12; G01N 33/2835; G01N 1/286; G01N 2001/4088; G01N 2035/00435; G01N 30/7246; G01N 33/548; G01N 33/96; G01N 35/1009; G01N 2030/743; G01N 31/22; G01N 33/24; G01N 33/689; G01N 35/00871; G01N 2035/00752; G01N 2035/1025; G01N 21/39; G01N 2333/31; G01N 27/226; G01N 27/30; G01N 27/44704; G01N 27/44756; G01N 33/0047; G01N 35/1016; G01N 2035/103; G01N 21/3577; G01N 27/26; G01N 27/44743; G01N 33/552; G01N 33/56933; G01N 2035/0484; G01N 2291/021; G01N 30/7293; G01N 30/861; G01N 33/241; G01N 33/491; G01N 33/544; G01N 33/66; G01N 2030/7226; G01N 2035/00326; G01N 21/41; G01N 21/643; G01N 2333/015; G01N 27/221; G01N 27/4045; G01N 30/0005; G01N 33/5076; G01N 33/56944; G01N 35/0092; G01N 35/026; G01N 1/2273; G01N 2001/2893; G01N 2030/685; G01N 21/255; G01N 2201/0221; G01N 29/022; G01N 33/287; G01N 33/54333; G01N 1/2226; G01N 2001/4016; G01N 2021/0112; G01N 2035/0091; G01N 27/12; G01N 27/44795; G01N 33/487; G01N 1/10; G01N 15/06; G01N 21/73; G01N 2201/0621; G01N 23/046; G01N 2458/15; G01N 27/44791; G01N 33/569; G01N 33/56938; G01N 33/726; G01N 35/1065; G01N 2035/00356; G01N 21/3581; G01N 2201/0693; G01N 2291/0256; G01N 2291/0426; G01N 27/301; G01N 33/535; G01N 33/542; G01N 33/5758; G01N 33/686; G01N 33/9493; G01N 35/085; G01N 2001/4027; G01N 2021/3595; G01N 2035/0439; G01N 21/45; G01N 21/67; G01N 22/00; G01N 2291/0423; G01N 23/04; G01N 27/44752; G01N 29/0672; G01N 30/722; G01N 33/1826; G01N 33/54391; G01N 33/56988; G01N 33/6896; G01N 35/00009; G01N 1/18; G01N 15/0211; G01N 2015/0038; G01N 2030/862; G01N 2035/0444; G01N 2035/0465; G01N 2201/08; G01N 2440/14; G01N 27/44773; G01N 27/70; G01N 2800/324; G01N 30/7286; G01N 33/0001; G01N 33/5306; G01N 33/5695; G01N 33/60; G01N 33/78; G01N 1/02; G01N 1/24; G01N 11/04; G01N 2021/0321; G01N 2021/0357; G01N 2035/00554; G01N 2035/00782; G01N 2035/0498; G01N 21/72; G01N 21/86; G01N 2333/47; G01N 2333/976; G01N 2440/10; G01N 25/147; G01N 27/16; G01N 33/182; G01N 33/22; G01N 33/48735; G01N 33/5008; G01N 11/08; G01N 2001/045; G01N 2021/6482; G01N 2021/7759; G01N 21/0332; G01N 27/4166; G01N 2800/042; G01N 31/16; G01N 33/0062; G01N 33/6857; G01N 35/08; G01N 1/26; G01N 13/00; G01N 15/08; G01N 2035/041; G01N 2035/1053; G01N 21/3103; G01N 21/35; G01N 21/59; G01N 21/6458; G01N 2201/0627; G01N 2333/35; G01N 27/00; G01N 27/06; G01N 27/14; G01N 2800/348; G01N 30/726; G01N 33/12; G01N 33/536; G01N 33/9446; G01N 1/00; G01N 1/2202; G01N 1/4022; G01N 2001/383; G01N 2021/335; G01N 2030/3092; G01N 2030/647; G01N 2030/8452; G01N 2030/8476; G01N 2030/903; G01N 2035/00564; G01N 2035/00851; G01N 2035/1037; G01N 21/0303; G01N 21/09; G01N 21/274; G01N 21/631; G01N 25/18; G01N 31/005; G01N 33/025; G01N 33/225; G01N 33/54389; G01N 33/571; G01N 35/1002; G01N 2021/6432; G01N 2035/00792; G01N 2035/00811; G01N 2035/1032; G01N 2035/1046; G01N 2201/129; G01N 2333/195; G01N 2333/20; G01N 2333/4716; G01N 2496/00; G01N 25/04; G01N 31/00; G01N 33/0004; G01N 33/0027; G01N 33/0098; G01N 33/49; G01N 33/521; G01N 33/559; G01N 33/5764; G01N 33/581; G01N 35/00722; G01N 15/01; G01N 2001/4083; G01N 2021/6417; G01N 2035/00772; G01N 21/82; G01N 2223/419; G01N 23/2258; G01N 2333/08; G01N 2333/415; G01N 2400/40; G01N 2600/00; G01N 2800/50; G01N 33/0009; G01N 33/0011; G01N 33/0019; G01N 33/0032; G01N 33/0034;

G01N 33/2811; G01N 33/2882; G01N 33/6827; G01N 33/6887; G01N 5/04; G01N 2001/2873; G01N 2021/6467; G01N 2021/8488; G01N 2030/162; G01N 2030/8648; G01N 2030/8863; G01N 2035/00158; G01N 2035/0491; G01N 2035/1027; G01N 21/49; G01N 21/77; G01N 2201/1061; G01N 2201/062; G01N 2291/0289; G01N 2333/162; G01N 2333/38; G01N 2333/59; G01N 27/423; G01N 1/4005; G01N 2021/052; G01N 2021/3181; G01N 2035/00346; G01N 2035/00514; G01N 2035/00762; G01N 2035/00801; G01N 2035/0429; G01N 21/6456; G01N 2001/1242; G01N 2333/005; G01N 2333/37; G01N 2430/00; G01N 25/14; G01N 27/041; G01N 2800/04; G01N 2800/085; G01N 2800/7028; G01N 31/10; G01N 33/0031; G01N 33/14; G01N 33/4977; G01N 33/6812; G01N 33/9406; G01N 1/42; G01N 11/00; G01N 15/0625; G01N 2015/0687; G01N 2021/7789; G01N 2035/00831; G01N 2035/0415; G01N 21/00; G01N 21/031; G01N 21/11; G01N 21/1702; G01N 2333/916; G01N 2800/028; G01N 30/8655; G01N 33/0014; G01N 33/184; G01N 33/48707; G01N 33/5002; G01N 33/5085; G01N 33/5434; G01N 33/56961; G01N 35/00712; G01N 35/1081; G01N 1/2813; G01N 2001/028; G01N 2021/1765; G01N 2035/00108; G01N 2035/042; G01N 2035/0422; G01N 2035/0475; G01N 2035/0477; G01N 2035/106; G01N 21/4795; G01N 2333/075; G01N 2333/09; G01N 2333/4712; G01N 2333/4725; G01N 2333/70596; G01N 2333/924; G01N 2400/10; G01N 2470/04; G01N 2496/80; G01N 2500/00; G01N 27/02; G01N 27/04; G01N 27/07; G01N 27/44769; G01N 2800/065; G01N 31/168; G01N 33/10; G01N 33/18; G01N 33/188; G01N 33/523; G01N 33/526; G01N 33/5304; G01N 33/56972; G01N 33/56994; G01N 33/6869; G01N 35/00693; G01N 1/04; G01N 15/00; G01N 15/0826; G01N 2011/0026; G01N 2013/003; G01N 2015/0216; G01N 2021/8887; G01N 2035/00881; G01N 2035/0093; G01N 2035/0418; G01N 2035/1051; G01N 21/15; G01N 21/23; G01N 21/27; G01N 21/314; G01N 21/3563; G01N 21/3586; G01N 21/453; G01N 21/4788; G01N 21/5911; G01N 21/766; G01N 21/8851; G01N 2201/0642; G01N 2201/068; G01N 2333/01; G01N 2333/245; G01N 2333/4709; G01N 2333/4719; G01N 2333/4724; G01N 2333/585; G01N 2333/7051; G01N 2333/70517; G01N 2333/918; G01N 27/045; G01N 2800/2821; G01N 2800/60; G01N 33/04; G01N 33/146; G01N 33/2805; G01N 33/48714; G01N 33/56966; G01N 33/57515; G01N 33/6818; G01N 33/86; G01N 33/9486; G01N 1/2205; G01N 2001/002; G01N 2001/1463; G01N 2021/151; G01N 2021/1787; G01N 2030/765; G01N 2035/00306; G01N 2035/00445; G01N 2035/0453; G01N 2035/1058; G01N 2035/1088; G01N 21/21; G01N 21/553; G01N 21/63; G01N 21/71; G01N 2223/03; G01N 2333/135; G01N 2333/255; G01N 2333/315; G01N 2333/575; G01N 2333/65; G01N 24/087; G01N 2470/10; G01N 2474/00; G01N 25/72; G01N 27/08; G01N 27/10; G01N 27/453; G01N 29/44; G01N 3/02; G01N 33/5005; G01N 33/5436; G01N 33/5438; G01N 33/551; G01N 33/57525; G01N 35/0098; G01N 15/1023; G01N 2001/2866; G01N 2001/4011; G01N 2015/1028; G01N 2021/6463; G01N 2021/6484; G01N 2035/00277; G01N 2035/1055; G01N 21/0317; G01N 21/171; G01N 21/43; G01N 21/51; G01N 21/69; G01N 2201/064; G01N 2201/124; G01N 2458/40; G01N 2500/10; G01N 27/185; G01N 27/228; G01N 27/24; G01N 27/302; G01N 27/308; G01N 27/44782; G01N 2800/36; G01N 2800/7095; G01N 29/032; G01N 29/069; G01N 33/0016; G01N 33/03; G01N 33/5097; G01N 33/537; G01N 33/6815; G01N 33/6824; G01N 5/00; G01N 1/2035; G01N 1/2258; G01N 15/0806; G01N 15/082; G01N 2001/022; G01N 2001/1427; G01N 2001/205; G01N 2001/4066; G01N 2015/0046; G01N 2015/0288; G01N 2015/0846; G01N 2021/414; G01N 2021/5957; G01N 2021/6419; G01N 2021/6491; G01N 2021/7786; G01N 2030/001; G01N 2030/8895; G01N 2035/00237; G01N 2035/009; G01N 2035/102; G01N 2035/1069; G01N 21/17; G01N 21/19; G01N 21/251; G01N 21/4738; G01N 21/552; G01N 21/718; G01N 2201/0668; G01N 2333/16; G01N 2333/23; G01N 2333/30; G01N 2333/42; G01N 2333/4731; G01N 2333/475; G01N 2333/61; G01N 2333/76; G01N 2333/79; G01N 2440/00; G01N 2500/04; G01N 27/3272; G01N 27/44739; G01N 27/68; G01N 27/74; G01N 27/82; G01N 2800/26; G01N 2800/30; G01N 2800/347; G01N 29/02; G01N 33/0006; G01N 33/0022; G01N 33/0036; G01N 33/143; G01N 33/5011; G01N 33/525; G01N 33/539; G01N 33/575; G01N 33/57565; G01N 33/5761; G01N 33/6821; G01N 33/84; G01N 33/88; G01N 33/946; G01N 35/1067; G01N 1/2211; G01N 1/2247; G01N 1/30; G01N 11/02; G01N 15/0656; G01N 2001/387; G01N 2021/0367; G01N 2021/1706; G01N 2021/1793; G01N 2021/3129; G01N 2021/458; G01N 2021/6421; G01N 2021/6469; G01N 2021/651; G01N

2030/0015; G01N 2035/0493; G01N 21/61; G01N 21/75; G01N 21/763; G01N 21/8422; G01N 21/8806; G01N 2201/0639; G01N 2201/1293; G01N 2223/612; G01N 2291/018; G01N 2291/0231; G01N 2291/0232; G01N 2291/0234; G01N 2291/02809; G01N 2333/032; G01N 2333/14; G01N 2333/285; G01N 2333/32; G01N 2333/43508; G01N 2333/45; G01N 2333/471; G01N 2333/525; G01N 2333/70539; G01N 2333/765; G01N 2333/78; G01N 2333/922; G01N 2333/986; G01N 2430/10; G01N 2458/20; G01N 25/00; G01N 25/12; G01N 2500/02; G01N 27/38; G01N 27/403; G01N 27/44765; G01N 27/83; G01N 27/9006; G01N 2800/044; G01N 2800/067; G01N 2800/12; G01N 2800/24; G01N 2800/368; G01N 2800/56; G01N 29/024; G01N 29/4454; G01N 29/4481; G01N 33/0013; G01N 33/0057; G01N 33/1846; G01N 33/26; G01N 33/5014; G01N 33/5038; G01N 33/5091; G01N 33/534; G01N 33/557; G01N 33/561; G01N 33/563; G01N 33/5752; G01N 33/5755; G01N 33/57557; G01N 33/6866; G01N 33/6884; G01N 33/9453; G01N 33/9466; G01N 35/00594; G01N 35/02; G01N 7/14; G01N 13/02; G01N 15/0272; G01N 15/1404; G01N 2001/021; G01N 2001/1006; G01N 2001/1031; G01N 2001/2217; G01N 2001/2223; G01N 2001/2261; G01N 2001/227; G01N 2001/242; G01N 2001/248; G01N 2001/288; G01N 2015/0011; G01N 2015/0053; G01N 2015/084; G01N 2021/0106; G01N 2021/115; G01N 2021/1714; G01N 2021/1736; G01N 2021/216; G01N 2021/4126; G01N 2021/4146; G01N 2021/4711; G01N 2021/641; G01N 2021/6478; G01N 2021/7753; G01N 2021/7796; G01N 2021/8466; G01N 2030/0025; G01N 2030/8458; G01N 2035/00386; G01N 2035/1039; G01N 21/29; G01N 21/474; G01N 21/55; G01N 21/648; G01N 21/68; G01N 21/7703; G01N 2201/0245; G01N 2201/0636; G01N 2201/0691; G01N 2223/04; G01N 2223/1013; G01N 2223/40; G01N 2223/401; G01N 2223/616; G01N 2291/015; G01N 2291/023; G01N 2291/02827; G01N 2291/02854; G01N 2291/105; G01N 23/06; G01N 23/223; G01N 23/2251; G01N 2333/03; G01N 2333/13; G01N 2333/145; G01N 2333/185; G01N 2333/205; G01N 2333/265; G01N 2333/28; G01N 2333/385; G01N 2333/405; G01N 2333/4713; G01N 2333/58; G01N 2333/70535; G01N 2333/914; G01N 2333/98; G01N 2400/02; G01N 2405/08; G01N 2440/12; G01N 2440/20; G01N 27/123; G01N 27/3278; G01N 27/42; G01N 27/44786; G01N 27/49; G01N 27/9046; G01N 2800/06; G01N 2800/122; G01N 2800/2857; G01N 2800/2871; G01N 2800/321; G01N 2800/325; G01N 2800/38; G01N 29/036; G01N 29/045; G01N 29/0618; G01N 29/09; G01N 29/4427; G01N 29/4463; G01N 31/002; G01N 31/164; G01N 33/0018; G01N 33/0026; G01N 33/0044; G01N 33/007; G01N 33/0096; G01N 33/1813; G01N 33/2888; G01N 33/34; G01N 33/445; G01N 33/46; G01N 33/4905; G01N 33/502; G01N 33/528; G01N 33/547; G01N 33/56977; G01N 33/579; G01N 33/6863; G01N 33/70; G01N 33/90; G01N 33/9413; G01N 33/9433; G01N 33/9473; G01N 33/948; G01N 35/1072; G01N 5/02; G01N 7/00; G01N 9/32; G01N 1/20; G01N 1/32; G01N 15/04; G01N 15/042; G01N 15/065; G01N 15/088; G01N 15/10; G01N 15/1456; G01N 15/1459; G01N 2001/007; G01N 2001/027; G01N 2001/1418; G01N 2001/1436; G01N 2001/2057; G01N 2001/2244; G01N 2001/282; G01N 2001/386; G01N 2015/0092; G01N 2015/0294; G01N 2015/1493; G01N 2021/0307; G01N 2021/0328; G01N 2021/0382; G01N 2021/054; G01N 2021/152; G01N 2021/1738; G01N 2021/3155; G01N 2021/3159; G01N 2021/3572; G01N 2021/653; G01N 2021/775; G01N 2021/7793; G01N 2021/888; G01N 2030/0065; G01N 2030/382; G01N 2035/00148; G01N 2035/00178; G01N 2035/00247; G01N 2035/00376; G01N 2035/00465; G01N 2035/00534; G01N 2035/00544; G01N 2035/00633; G01N 2035/00673; G01N 2035/00891; G01N 2035/0094; G01N 2035/0405; G01N 2035/0406; G01N 2035/0451; G01N 2035/1018; G01N 21/253; G01N 21/3151; G01N 21/431; G01N 21/554; G01N 21/6404; G01N 21/6447; G01N 21/66; G01N 21/7746; G01N 21/783; G01N 21/896; G01N 21/94; G01N 21/95; G01N 2201/0225; G01N 2201/0624; G01N 2201/0633; G01N 2201/0638; G01N 2201/065; G01N 2201/066; G01N 2201/0695; G01N 2201/12; G01N 2201/121; G01N 2201/1296; G01N 2203/0682; G01N 2223/316; G01N 2333/3306; G01N 2291/0215; G01N 2291/024; G01N 2291/02836; G01N 2291/0427; G01N 2291/048; G01N 2291/102; G01N 23/044; G01N 23/207; G01N 2333/085; G01N 2333/115; G01N 2333/183; G01N 2333/25; G01N 2333/3156; G01N 2333/325; G01N 2333/44; G01N 2333/465; G01N 2333/4746; G01N 2333/54; G01N 2333/595; G01N 2333/605; G01N 2333/62; G01N 2333/705; G01N 2333/7155; G01N

2333/7156; G01N 2333/775; G01N 2333/902; G01N 2333/904; G01N 2333/91085; G01N 2333/96413; G01N 2333/96416; G01N 2333/96466; G01N 2333/974; G01N 2333/978; G01N 2333/99; G01N 24/081; G01N 24/082; G01N 24/088; G01N 2400/18; G01N 2400/38; G01N 2400/50; G01N 2405/04; G01N 2410/00; G01N 2446/20; G01N 2446/40; G01N 2470/06; G01N 25/32; G01N 27/28; G01N 27/327; G01N 27/3273; G01N 27/3275; G01N 27/404; G01N 27/4074; G01N 27/4075; G01N 27/4145; G01N 27/416; G01N 27/4175; G01N 27/44708; G01N 27/44726; G01N 27/72; G01N 27/725; G01N 27/9026; G01N 2800/00; G01N 2800/046; G01N 2800/125; G01N 2800/222; G01N 2800/2828; G01N 2800/2864; G01N 2800/32; G01N 2800/42; G01N 29/04; G01N 29/14; G01N 29/222; G01N 29/2418; G01N 29/4472; G01N 29/449; G01N 29/46; G01N 33/0003; G01N 33/005; G01N 33/0054; G01N 33/0095; G01N 33/1806; G01N 33/1833; G01N 33/227; G01N 33/30; G01N 33/42; G01N 33/483; G01N 33/4833; G01N 33/492; G01N 33/4925; G01N 33/5073; G01N 33/5094; G01N 33/5375; G01N 33/555; G01N 33/56905; G01N 33/56922; G01N 33/56927; G01N 33/5753; G01N 33/57545; G01N 33/57555; G01N 33/5756; G01N 33/5757; G01N 33/5767; G01N 33/64; G01N 33/6839; G01N 33/6875; G01N 33/6878; G01N 33/728; G01N 35/1074; G01N 5/045; G01N 7/04; G01N 9/00; G01N 9/24; B01D 15/22; B01D 15/3809; B01D 15/3804; B01D 15/08; B01D 15/363; B01D 15/362; B01D 15/206; B01D 15/20; B01D 15/327; B01D 15/361; B01D 15/14; B01D 15/34; B01D 15/40; B01D 15/10; B01D 15/325; B01D 15/166; B01D 15/3847; B01D 15/426; B01D 15/1871; B01D 15/1864; B01D 15/424; B01D 15/203; B01D 15/305; B01D 15/36; B01D 15/1807; B01D 15/3828; B01D 15/18; B01D 15/1885; B01D 15/3833; B01D 15/1821; B01D 15/1892; B01D 15/163; B01D 15/1878; B01D 15/38; B01D 15/422; B01D 53/025; B01D 15/12; B01D 15/16; B01D 15/265; B01D 15/24; B01D 15/1828; B01D 15/185; B01D 15/1842; B01D 15/247; B01D 15/322; B01D 15/161; B01D 15/165; B01D 69/02; B01D 15/366; B01D 15/42; B01D 15/30; B01D 63/10; B01D 15/1814; B01D 15/367; B01D 11/0203; B01D 15/26; B01D 15/125; B01D 15/3885; B01D 15/32; B01D 63/082; B01D 19/0031; B01D 2325/12; B01D 15/3823; B01D 15/168; B01D 11/0288; B01D 2313/40; B01D 2311/2626; B01D 2315/16; B01D 69/148; B01D 15/00; B01D 67/00931; B01D 15/3819; B01D 59/30; B01D 61/145; B01D 39/14; B01D 61/44; B01D 15/364; B01D 19/00; B01D 15/3857; B01D 71/024; B01D 19/0036; B01D 53/02; B01D 59/26; B01D 15/245; B01D 15/3842; B01D 19/0063; B01D 2323/30; B01D 2325/0283; B01D 15/3876; B01D 2315/10; B01D 39/1623; B01D 2313/08; B01D 53/0423; B01D 61/027; B01D 11/04; B01D 39/16; B01D 19/0042; B01D 2313/12; B01D 2325/36; B01D 11/0492; B01D 19/0005; B01D 2313/14; B01D 69/106; B01D 69/12; B01D 71/0281; B01D 2313/62; B01D 71/82; B01D 57/02; B01D 15/1857; B01D 15/428; B01D 2253/202; B01D 63/087; B01D 67/0093; B01D 71/10; B01D 69/147; B01D 61/48; B01D 71/027; B01D 63/024; B01D 63/14; B01D 71/36; B01D 9/0004; B01D 2311/2697; B01D 2221/10; B01D 2253/102; B01D 2323/36; B01D 15/242; B01D 61/00; B01D 15/3814; B01D 2319/04; B01D 61/146; B01D 63/034; B01D 71/261; B01D 71/56; B01D 15/02; B01D 15/365; B01D 2253/106; B01D 53/0407; B01D 69/1411; B01D 71/262; B01D 71/68; B01D 71/26; B01D 11/02; B01D 15/1835; B01D 2311/08; B01D 61/18; B01D 61/58; B01D 2253/308; B01D 69/08; B01D 11/0242; B01D 15/1896; B01D 61/52; B01D 11/0403; B01D 11/0407; B01D 2325/34; B01D 61/22; B01D 61/422; B01D 63/0822; B01D 63/107; B01D 69/141; B01D 71/34; B01D 63/084; B01D 39/08; B01D 45/16; B01D 59/00; B01D 63/081; B01D 69/10; B01D 11/028; B01D 15/102; B01D 19/0073; B01D 2325/14; B01D 2325/16; B01D 2325/20; B01D 29/56; B01D 59/44; B01D 17/12; B01D 19/0015; B01D 2257/91; B01D 2313/04; B01D 2317/022; B01D 2323/16; B01D 45/08; B01D 63/02; B01D 9/0013; B01D 2313/042; B01D 53/04; B01D 67/0006; B01D 71/021; B01D 9/0009; B01D 15/1894; B01D 35/02; B01D 69/144; B01D 2253/31; B01D 2311/04; B01D 2313/2031; B01D 61/147; B01D 65/0003; B01D 67/00933; B01D 11/0219; B01D 11/048; B01D 15/3852; B01D 19/0084; B01D 2311/2642; B01D 36/00; B01D 2313/44; B01D 2325/42; B01D 53/0438; B01D 61/02; B01D 61/462; B01D 63/005; B01D 67/0088; B01D 71/16; B01D 2317/025; B01D 53/18; B01D 53/30; B01D 71/64; B01D 19/0068; B01D 2253/25; B01D 2317/04; B01D 63/00; B01D 69/125; B01D 1/26; B01D 15/3866; B01D 19/0057; B01D 2311/16; B01D 2323/12; B01D 2323/58; B01D 24/008; B01D 24/14; B01D 53/0454; B01D 61/007; B01D 71/00; B01D 1/22; B01D 15/3861; B01D 2011/002; B01D 21/262; B01D 2256/24; B01D 2313/025; B01D 2313/105; B01D 2313/2061; B01D

2315/08; B01D 2325/04; B01D 3/10; B01D 63/06; B01D 11/0284; B01D 17/0217; B01D 2253/306; B01D 2313/125; B01D 63/066; B01D 11/0292; B01D 19/0021; B01D 2253/104; B01D 2253/311; B01D 2257/504; B01D 2311/2623; B01D 61/04; B01D 61/14; B01D 61/461; B01D 71/08; B01D 15/222; B01D 2239/1216; B01D 2325/38; B01D 29/03; B01D 29/96; B01D 3/42; B01D 39/1676; B01D 39/1692; B01D 67/0002; B01D 11/0415; B01D 11/0488; B01D 2239/065; B01D 2256/22; B01D 2257/70; B01D 2323/02; B01D 2323/38; B01D 36/003; B01D 53/047; B01D 67/0011; B01D 11/0426; B01D 21/26; B01D 2252/10; B01D 2256/18; B01D 2257/80; B01D 2259/41; B01D 2311/06; B01D 2313/02; B01D 2313/20; B01D 2325/02; B01D 2325/022; B01D 3/143; B01D 36/02; B01D 53/268; B01D 59/28; B01D 61/243; B01D 65/08; B01D 69/06; B01D 69/105; B01D 9/0045; B01D 11/0207; B01D 11/0265; B01D 11/043; B01D 11/0438; B01D 11/0484; B01D 19/0052; B01D 21/0009; B01D 2201/54; B01D 2239/0407; B01D 2239/0654; B01D 2256/12; B01D 2257/702; B01D 2259/40096; B01D 2311/2603; B01D 2321/2008; B01D 2325/0212; B01D 25/12; B01D 29/60; B01D 3/34; B01D 35/1435; B01D 39/18; B01D 53/0446; B01D 53/1493; B01D 61/0271; B01D 61/16; B01D 61/362; B01D 61/445; B01D 61/50; B01D 67/0009; B01D 67/009; B01D 67/0095; B01D 69/1214; B01D 71/74; B01D 8/00; B01D 1/0017; B01D 15/3871; B01D 15/388; B01D 17/0208; B01D 21/02; B01D 2201/16; B01D 2239/0428; B01D 2256/16; B01D 2257/708; B01D 2311/2649; B01D 2313/10; B01D 2313/24; B01D 2313/58; B01D 2321/16; B01D 2325/50; B01D 25/002; B01D 29/52; B01D 3/06; B01D 3/14; B01D 39/083; B01D 53/0431; B01D 53/228; B01D 59/50; B01D 61/025; B01D 61/029; B01D 61/20; B01D 61/38; B01D 61/46; B01D 61/54; B01D 63/0821; B01D 65/00; B01D 67/0016; B01D 67/00793; B01D 69/1216; B01D 71/02231; B01D 71/401; B01D 71/601; B01D 1/222; B01D 11/0476; B01D 11/0496; B01D 2239/0414; B01D 2239/10; B01D 2252/205; B01D 2256/10; B01D 2257/11; B01D 2257/7022; B01D 2258/02; B01D 2259/40001; B01D 2259/40005; B01D 2311/2676; B01D 2311/2699; B01D 2313/19; B01D 2313/23; B01D 2313/54; B01D 2313/90; B01D 2321/28; B01D 2323/18; B01D 2323/21835; B01D 2323/34; B01D 2323/345; B01D 2323/385; B01D 2323/40; B01D 2325/02834; B01D 2325/08; B01D 2325/22; B01D 29/01; B01D 29/50; B01D 3/02; B01D 3/346; B01D 3/36; B01D 39/04; B01D 39/06; B01D 39/086; B01D 39/1607; B01D 39/2034; B01D 37/2075; B01D 39/2093; B01D 51/10; B01D 53/06; B01D 53/14; B01D 53/1468; B01D 53/22; B01D 53/265; B01D 59/02; B01D 61/28; B01D 61/485; B01D 63/0233; B01D 63/08; B01D 63/089; B01D 67/0013; B01D 67/003; B01D 67/0046; B01D 67/0072; B01D 67/0083; B01D 69/082; B01D 69/871; B01D 69/108; B01D 69/1218; B01D 71/42; B01D 9/02; B01D 1/00; B01D 1/30; B01D 11/00; B01D 11/0211; B01D 11/0273; B01D 11/0419; B01D 15/1801; B01D 15/1867; B01D 17/00; B01D 17/0202; B01D 19/0078; B01D 19/02; B01D 21/01; B01D 21/30; B01D 2001/4046; B01D 2239/0622; B01D 2239/0627; B01D 2239/0668; B01D 2239/0695; B01D 2239/1291; B01D 2253/112; B01D 2253/20; B01D 2253/304; B01D 2253/34; B01D 2256/26; B01D 2257/206; B01D 2257/7027; B01D 2257/93; B01D 2258/0216; B01D 2259/124; B01D 2259/40088; B01D 2259/402; B01D 2259/4533; B01D 2311/13; B01D 2311/18; B01D 2311/26; B01D 2311/2688; B01D 2313/041; B01D 2313/13; B01D 2313/18; B01D 2313/203; B01D 2313/50; B01D 2313/60; B01D 2313/70; B01D 2321/04; B01D 2321/162; B01D 2321/168; B01D 2325/026; B01D 27/00; B01D 29/41; B01D 29/58; B01D 3/00; B01D 3/085; B01D 3/40; B01D 3/4211; B01D 33/0158; B01D 33/03; B01D 33/35; B01D 35/00; B01D 35/16; B01D 39/1653; B01D 39/20; B01D 39/2068; B01D 45/12; B01D 46/0001; B01D 46/0005; B01D 5/0057; B01D 53/0415; B01D 53/26; B01D 59/24; B01D 61/366; B01D 61/427; B01D 61/465; B01D 61/466; B01D 63/0241; B01D 63/16; B01D 65/02; B01D 67/0004; B01D 67/0018; B01D 67/0079; B01D 69/04; B01D 69/1071; B01D 69/1213; B01D 69/1251; B01D 71/028; B01D 76/06; B01D 71/20; B01D 71/28; B01D 71/38; B01D 9/004

See application file for complete search history.

(56) References Cited

U.S. PATENT DOCUMENTS

| | | | | |
|---|---|---|---|---|
| 5,911,954 | A * | 6/1999 | Ford | G01N 30/6039 210/198.2 |
| 6,095,572 | A | 8/2000 | Ford et al. | |
| 8,936,723 | B2 * | 1/2015 | Nickerson | B01D 15/22 210/656 |
| 10,527,215 | B2 * | 1/2020 | Buerger | G01N 30/6026 |
| 10,655,761 | B2 | 5/2020 | Graham et al. | |
| 2006/0266684 | A1 * | 11/2006 | Pichl | G01N 30/6021 210/198.2 |
| 2014/0130580 | A1 * | 5/2014 | Mcadams | B01L 3/563 285/386 |
| 2021/0339166 | A1 | 11/2021 | Belanger et al. | |

(56) References Cited

U.S. PATENT DOCUMENTS

| | | | | |
|---|---|---|---|---|
| 2024/0125745 | A1* | 4/2024 | Norman | G01N 30/6026 |
| 2024/0261704 | A1* | 8/2024 | Krewson | B01D 53/025 |

FOREIGN PATENT DOCUMENTS

| | | | |
|---|---|---|---|
| WO | 2004025162 | A2 | 3/2004 |
| WO | 2018017965 | A2 | 1/2018 |

OTHER PUBLICATIONS

International Preliminary Report on Patentability for International Patent Application No. PCT/US2024/018897, mailed Sep. 18, 2025.

* cited by examiner

CHROMATOGRAPHY COLUMN ADAPTERS WITH FACE SEALS FOR INTERFACING WITH CLAMPING FLUIDIC CONNECTORS

CROSS-REFERENCE TO RELATED APPLICATIONS

This patent application is a U.S. Nonprovisional Application which claims priority to and the benefit of U.S. Provisional Application No. 63/450,725, filed Mar. 8, 2023, the contents of which are hereby incorporated herein by reference in their entirety.

BACKGROUND

Conventional fluidic connections for liquid chromatography columns may take different forms. One form of conventional fluidic connection is hand tightened. This variety of fluidic connection is described in U.S. Patent Application Publication No. US2021/0048416 A1. This variety of fluidic connection is depicted in FIGS. 1A, 1B and IC of the present application. A threaded end fitting 100 is configured to fit into an end of a liquid chromatography column. One end fitting 100 may fit into an inlet end of a liquid chromatography column, and another end fitting 100 may fit into an outlet end of the liquid chromatography column. The end fitting 100 may include a face seal body 110, a collar 112, a tube sleeve 114, a compression screw 116, a retainer 118, an inner tube 120, and end face 180. The inner tube 120 may carry fluid to or from the liquid chromatography column. The tube 120 may secured to the tube sleeve via weld 182. The tube sleeve 114 includes a tapered surface 138. The end fitting 100 is designed for the distal end with the face seal body 110 to be pushed into a corresponding receiver positioned at an end of the liquid chromatography column. The compression screw 116 includes threads 102 A knurled grip portion 170 is provided on knob 168 to facilitate rotation of the knob 168.

As shown in FIG. 1C, the end fitting 100 is configured to interface with a receiver 150 positioned in one of the ends of the chromatography column. The receiver 150 has a threaded bore 154. The threaded portion 164 of the end fitting 100 may be screwed into the threads of the threaded bore 154 by turning the compression screw via rotation of the knob 168 by gripping and twisting the knurled grip 170. Conical surface 138 is shown positioned in the interior of a tapered bore 156 in the receiver 150. End face 180 of the seal body 110 of end fitting 100 abuts a sealing surface 158 of the receiver 150. A channel 152 for carrying fluid extends from the sealing surface 158. The receiver includes an inner bore 172 that extends from tapered bore 156 to the sealing surface 158.

Another conventional fluidic connector for a liquid chromatography column is described in U.S. Patent Application Publication No. US2019/0186670 A1. FIG. 2 depicts the conventional fluidic connector 200 described in that patent application publication. The fluidic connector 200 includes a polymer sleeve 210 that surrounds fused silica tubing 202' for carrying fluid. An outer sleeve 204 may be coupled to the polymer sleeve 202, such as via crimp connection created by crimps 206 and 208. A seal 210 may be disposed around a distal end of the sleeve 204. A compression screw 212 may be provided to apply distal axial force to create a fluid-tight seal at the distal end of the end fitting 200. The compression screw 212 includes splines 220 for assisting in gripping the compression screw 212. The compression screw 212 includes threads 214 formed along a portion of an outer surface that may interface with threads formed on a n inner sidewall of a coupling port. A drive feature 216 is provided on sleeve 204 to aid in distally urging the sleeve 204 into the coupling port. A retainer 218 couples the compression screw 212 to the end fitting 200. A driver 222 mates with a proximal portion of the compression screw 212 to aid a user in rotating the compression screw 212. The driver 222 includes a slot 224 for enabling the driver 222 to fit over shrink tubing 226. Shrink tubing 226 may be provided around the tube 202' for reinforcement and protection.

SUMMARY

In accordance with an inventive aspect an adapter is provided for a liquid chromatography column having a threaded end fitting for adapting the liquid chromatography column to be connected with a fluidic connector. The adapter may enable a fluidic connection or coupling of the liquid chromatography column using face seals rather than threaded connectors. The adapter may include an inner bore extending from a proximal end of the adapter to a distal end of the adapter. The adapter may further include a first face seal at the distal end of the adapter configured for interfacing with an inlet or an outlet of the liquid chromatography column. The adapter also may include a distal end of the adapter configured to mate with an end fitting of the liquid chromatography column. The distal end may include a first face seal configured for interfacing with an inlet or an outlet of the liquid chromatography column. The adapter may further include a second face seal at the proximal end of the adapter.

The adapter may additionally include a head portion having threads and a lock nut positioned over the threads for securing the adapter to the column end fitting of the liquid chromatography column. The adapter may include a grip portion with a flange for abutting an end surface of the end nut. The distal end of the adapter may include a tapered surface. The adapter may include threads on an outside of at least a portion of the distal end of the adapter for creating a threaded fit between the distal end of the adapter and a column end fitting. The connector may be a clamping fluidic connector, such as referenced below.

In accordance with another inventive facet, a liquid chromatography column assembly may include a liquid chromatography column and a threaded column end fitting on a first end of the liquid chromatography column. The liquid chromatography column assembly may further include an adapter for adapting the liquid chromatography column to be connected with a connector. The adapter may have an inner bore extending from a proximal end of the adapter to a distal end of the adapter. The adapter may further include a first face seal at the distal end of the adapter configured for interfacing with an inlet or an outlet of the liquid chromatography column and a distal end of the adapter configured to mate with an end nut of the liquid chromatography column. The distal end may include a first face seal at the distal end of the adapter configured for interfacing with an inlet or an outlet of the liquid chromatography column. The adapter may also include a second face seal at the proximal end of the adapter.

The liquid chromatography column assembly may include an additional threaded column end fitting on a second end of the liquid chromatography column and an additional adapter positioned in the additional threaded column end fitting. The threaded column end fitting may be an end nut. The liquid chromatography column assembly may include a head portion having threads and a lock nut positioned over the threads for securing the adapter to the threaded column end fitting of the liquid chromatography column. The adapter may include a grip portion with a flange for abutting an end surface of the end nut. The distal end of the adapter may have a tapered surface. The adapter may have threads on an outside of at least a portion of the distal end of the adapter for creating a threaded fit between the distal end of the adapter and the column end nut. The connector may be a clamping fluidic connector.

In accordance with a further inventive facet, a method of connecting an adapter having a proximal face seal and a distal face seal to a threaded column end fitting of a liquid chromatography column is provided. The method may include mating a male connector of the adapter with a female connector of the threaded column end fitting so that the distal face seal of the adapter is positioned at the inlet or the outlet of the liquid chromatography column and the proximal face seal remains exposed. The method may further include rotating a lock nut on the adapter over threads of the column end fitting to secure the adapter to the column.

The mating may include positioning the male connector of the adapter in contact with the female connector of the column end fitting. The male connector may be a tapered surface and the female connector may be a tapered bore. The mating may entail positioning the tapered surface in the tapered bore. The method may include attaching the column end fitting to the liquid chromatography column.

DETAILED DESCRIPTION

Conventional threaded fluidic connections for liquid chromatography columns, like those described above, do not have features allowing the use of face seals, which enable them to be used with clamping fluidic connectors. The exemplary embodiments may provide adapters that interface with conventional threaded column end fittings so that the column end fittings may be used with the clamping fluidic connectors. Thus, parties that have already invested in purchasing chromatography columns with such conventional threaded column end fittings can still use those columns with clamping fluidic connectors which require face seals.

The adapters of the exemplary embodiments may include lock nuts for securing the adapters to column end fittings of liquid chromatography columns. The lock nuts may include threads that bear the load of the adapter rather than the column end fitting of the chromatography column. The threads of the lock nut become the load bearing surfaces, and the load is distributed over the surfaces where the threads of the adapter mate with the threads of the lock nut. This approach helps protect the column end fitting of the liquid chromatography column from harm due to the applied load.

"Liquid chromatography column" is used herein to refer to a chromatography column through which liquid mobile phase with one or more analyte samples passes and is intended to encompass ultra-high pressure liquid chromatography (UHPLC) and high pressure liquid chromatography (HPLC) columns.

Figure 1A:
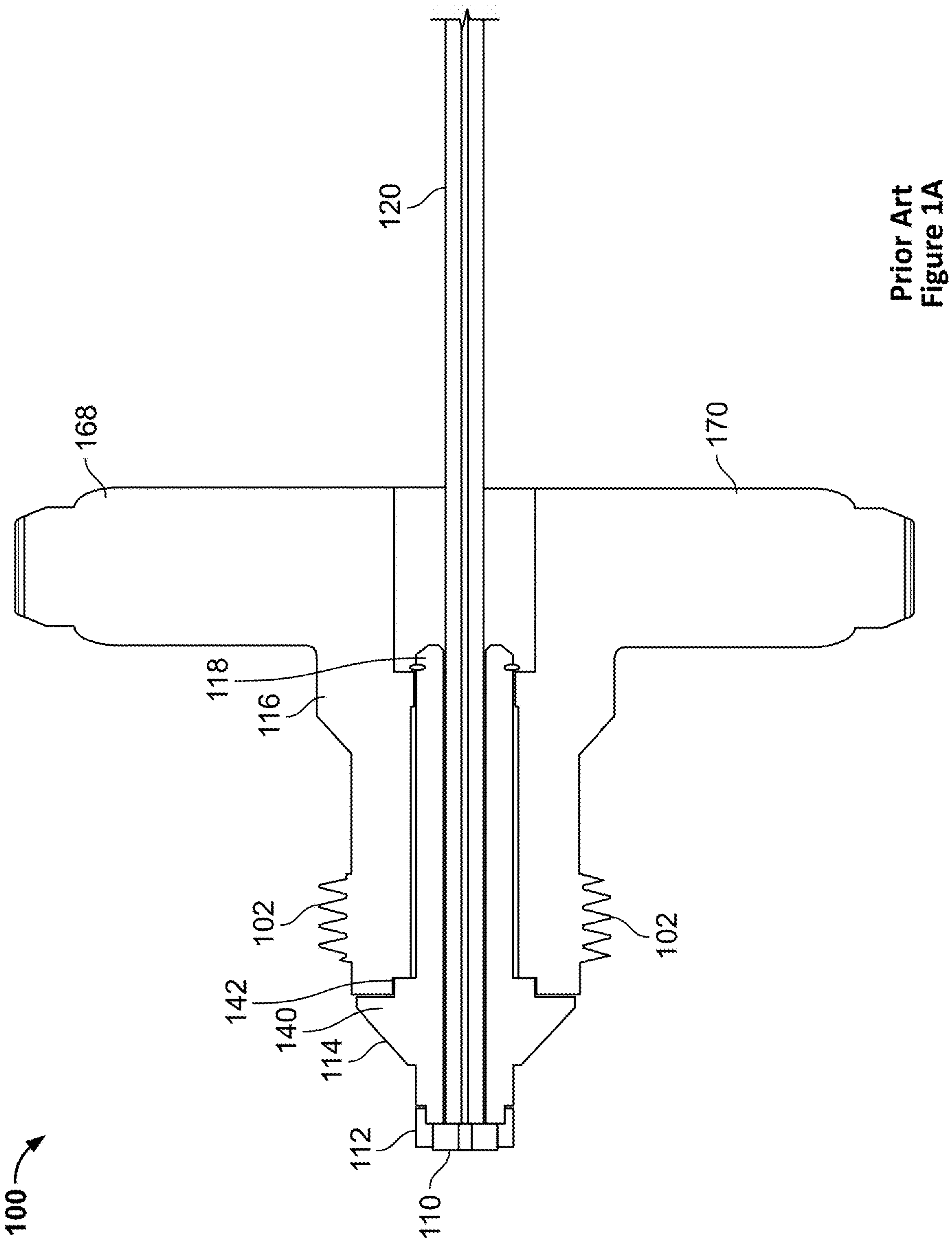
Prior Art Figure 1A
FIGS. 1A and 1B depict a first variety of conventional column end fitting allowing for fluidically coupling a liquid chromatography column to a liquid chromatography mass spectrometer (LCMS) system.
Figure 1B:
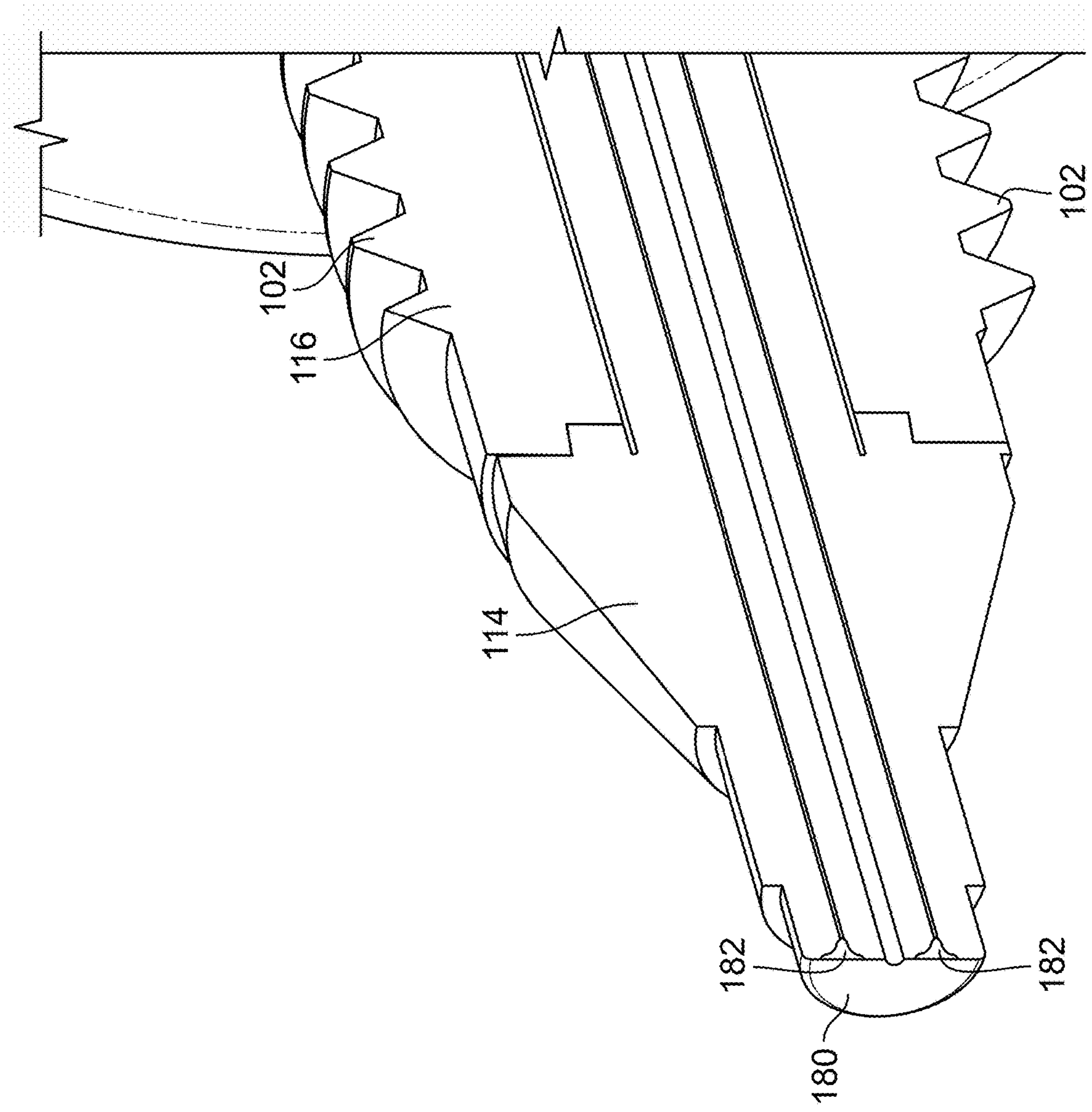
Prior Art Figure 1B
Figure 1C:
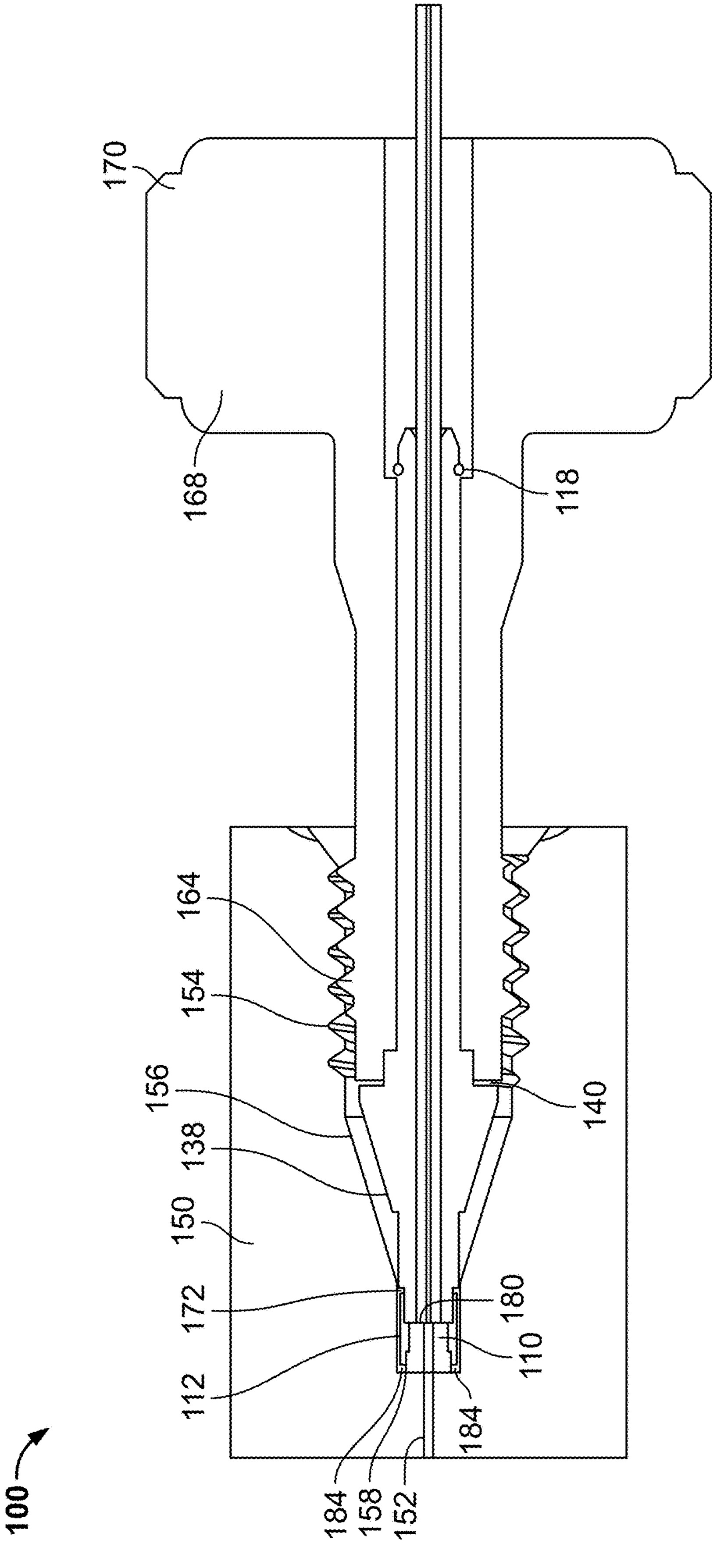
Prior Art Figure 1C
FIG. 1C depicts a conventional column end fitting interfaced with a receiver of a liquid chromatography column.
Figure 2:
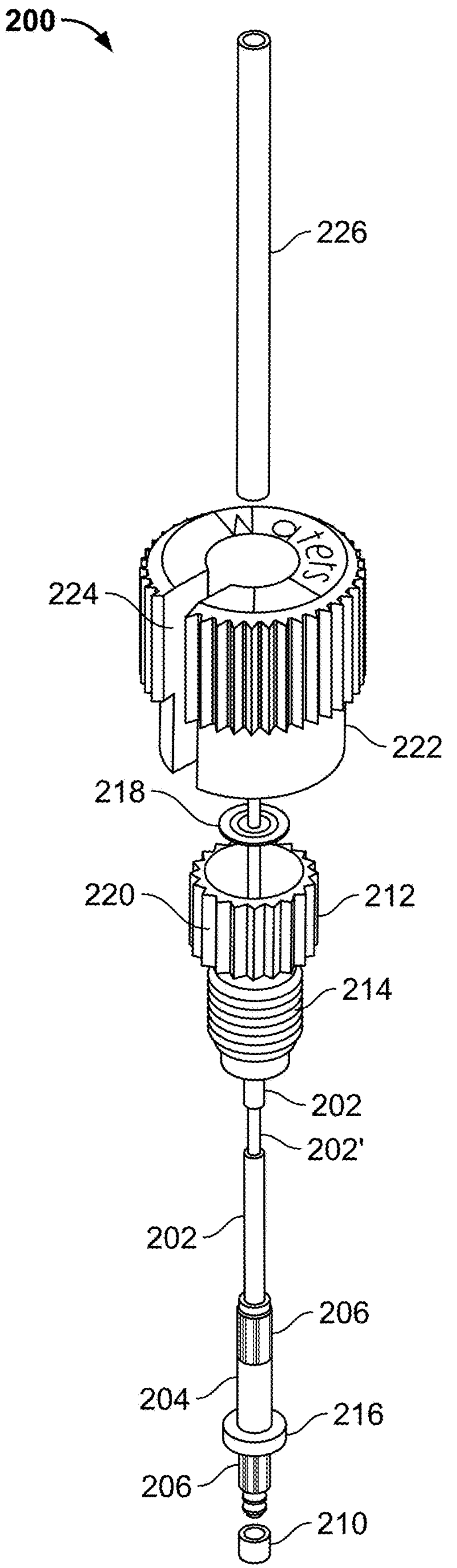
Prior Art Figure 2
FIG. 2 depicts a second variety of conventional column end fitting for a liquid chromatography column.
Figure 3A:
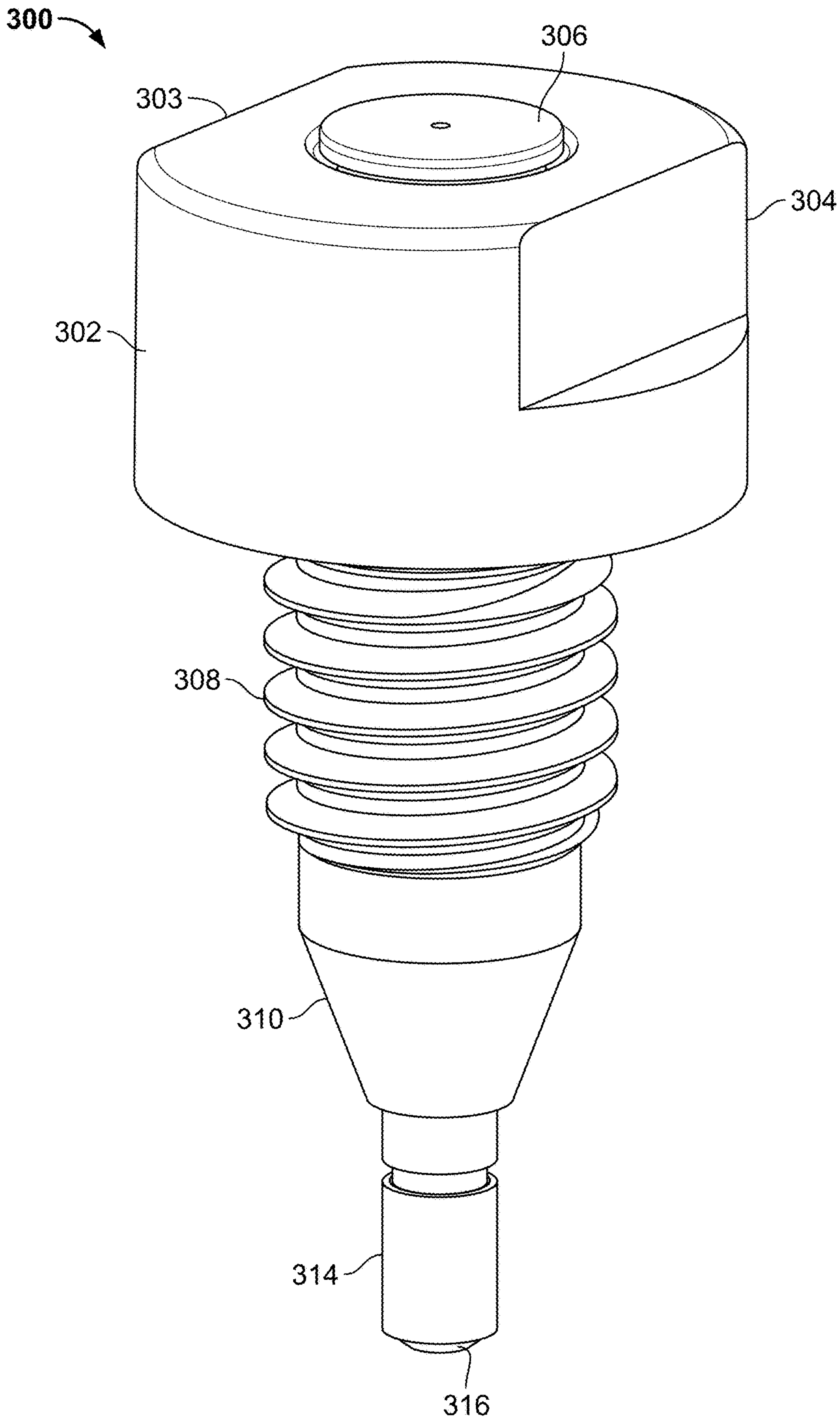
FIG. 3A depicts an illustrative embodiments of an adapter without a lock nut for an inlet or an outlet of a liquid chromatography column for an exemplary embodiment.

FIG. 3A depicts a perspective view of an illustrative adapter 300 for an inlet of a liquid chromatography columns in accordance with an exemplary embodiment. The adapter 300 includes a head portion 302 that acts as a grip portion and may include flat surfaces 303 and 304 that may be manually gripped or gripped by a tool to facilitate insertion of the adapter 300 into a column end nut of a liquid chromatography column and to facilitate removal of the adapter 300 from the column end nut. A face seal 306 may be positioned at the proximal head 302 of the adapter 300. The adapter 300 may include external threads 308 that may interface with internal threads of a column end nut. As will be discussed below, the threads 308 help to urge the adapter 300 into an engaged position with the column end nut. The adapter 300 also may include a tapered portion 310 that is tapered to case insertion into a column end nut. The adapter 300 has a neck 314. A face seal 316 is positioned at the distal end of the adapter 300.

Figure 3B:
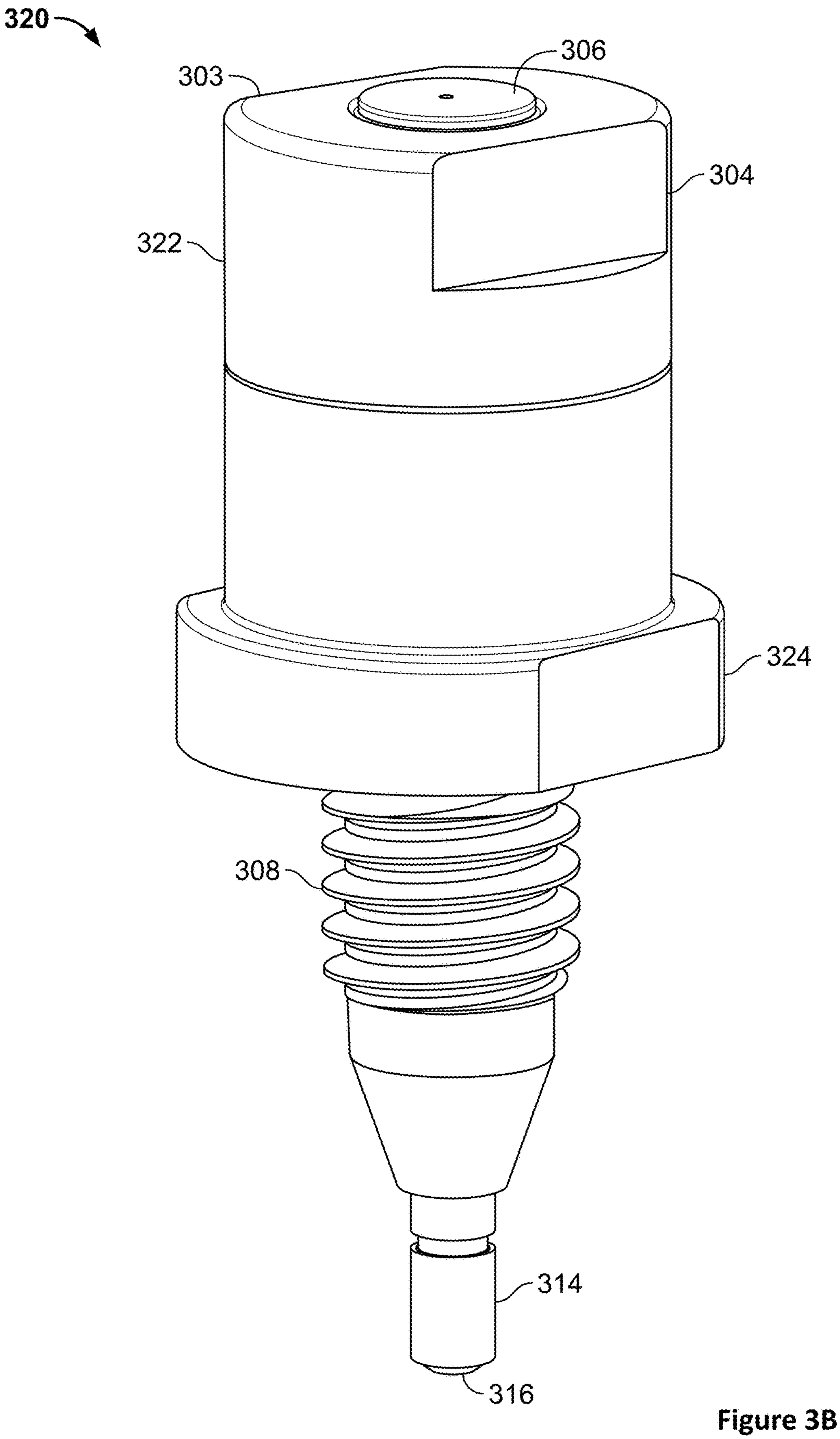
FIG. 3B depicts another embodiments of an illustrative adapter with a lock nut for an inlet or outlet of a liquid chromatography column for an exemplary embodiment.

FIG. 3B depicts a perspective view of an illustrative adapter 320 for an inlet of a liquid chromatography column with a lock nut in accordance with an exemplary embodiment. The adapter 320 is similar to the adapter 300 of FIG. 3A in that adapter 320 includes a head portion 322 that serves as a grip portion and that may include flat surfaces 303 and 304 or other surfaces, such as hexagonal shape as well as a face seal 306. The head portion 322 may include a flange for abutting a lock nut 324. The head portion 322 may include external threads 308, a neck 314, and a distal face seal 316, like adapter 300. The adapter 320 differs in part in that it includes the lock nut 324

The bodies of the adapters 300, 320, may be made of a suitable material. Examples of a suitable material may include stainless steel (such as stainless steel 316), titanium, an MP35N nickel-cobalt alloy. The face seals may be made of a plastic or other suitable materials, which allow for adequate sealing performance.

Figure 4A:
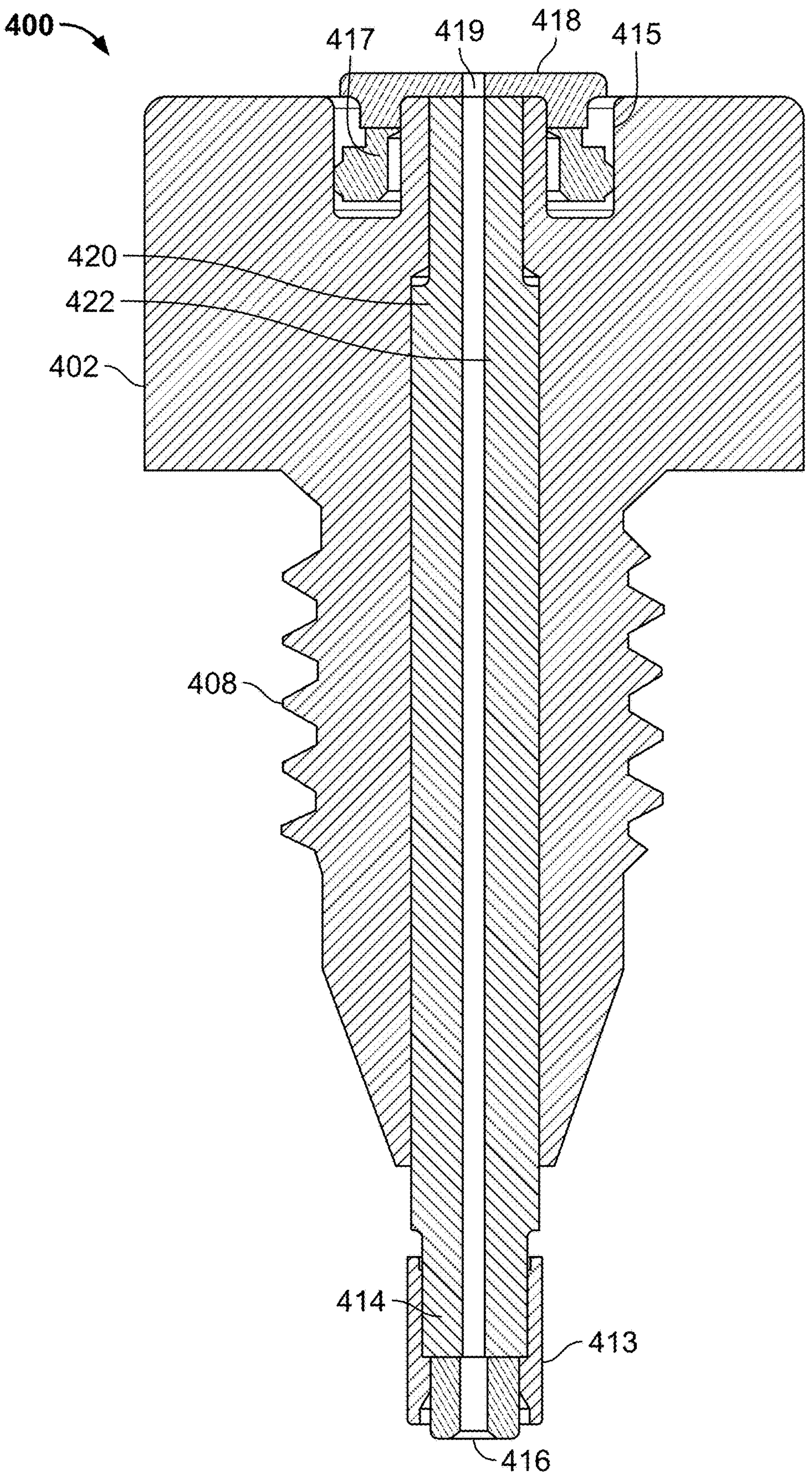
FIG. 4A depicts a cross-sectional view of adapter without lock nuts for connection to a liquid chromatography column for exemplary embodiments.

FIG. 4A depicts a cross-sectional view of an adapter 400 without a lock nut (like adapter 300 of FIG. 3A). As can be seen, a tube 420 extends from the proximal end to the distal end of the adapter 400. The tube 420 may be inserted into the body of the adapter 400 during manufacturing. The tube 420 includes an internal bore or lumen 422 for carrying fluid to/from the liquid chromatography column. A proximal face seal 418 is positioned on the proximal end and is configured to interface with a fluidic connector like a clamping fluidic connector. The seal 418 includes a central port 419 through which fluid may pass. There is a friction fit between features 415 and the proximal face seal 418. A flexure 417 may be provided to hold the proximal face seal 418 in place. A distal face seal 416 is provided. A retainer 413 is provided for the gasket. The adapter 400 has features 402, 408, and 414 as described above.

Figure 4B:
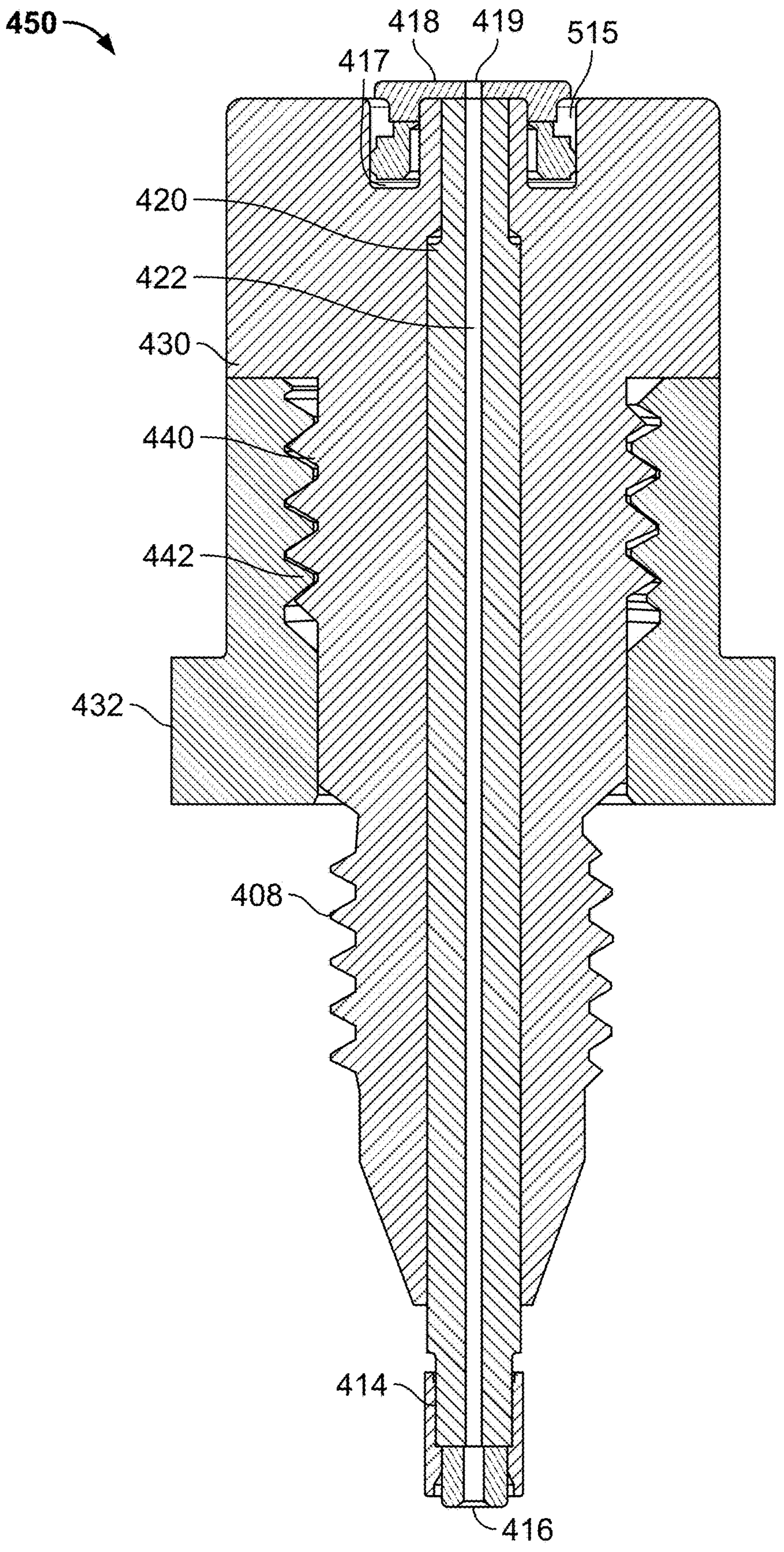
FIG. 4B depicts a cross-sectional view of adapters with lock nuts for connection to a liquid chromatography column for exemplary embodiments.

FIG. 4B depicts a cross-sectional view of illustrative adapter 450 of exemplary embodiments. Adapter 450 is like adapter 320 of FIG. 3B, The adapter 450 includes a lock nut 432 with internal threads 442 as well as external threads 540 on the axially extending bodies of the adapters 450. The lock nuts 432 may be rotated to secure the adapter 450 to the column end nut. As discussed below, the lock nut 432 has the benefit of bearing the load on the threads 440 so that excessive pressure is not applied to the column end nut when the adapter 450 is engaged. The adapter 450 has features as described above relative to adapter 400.

Figure 5A:
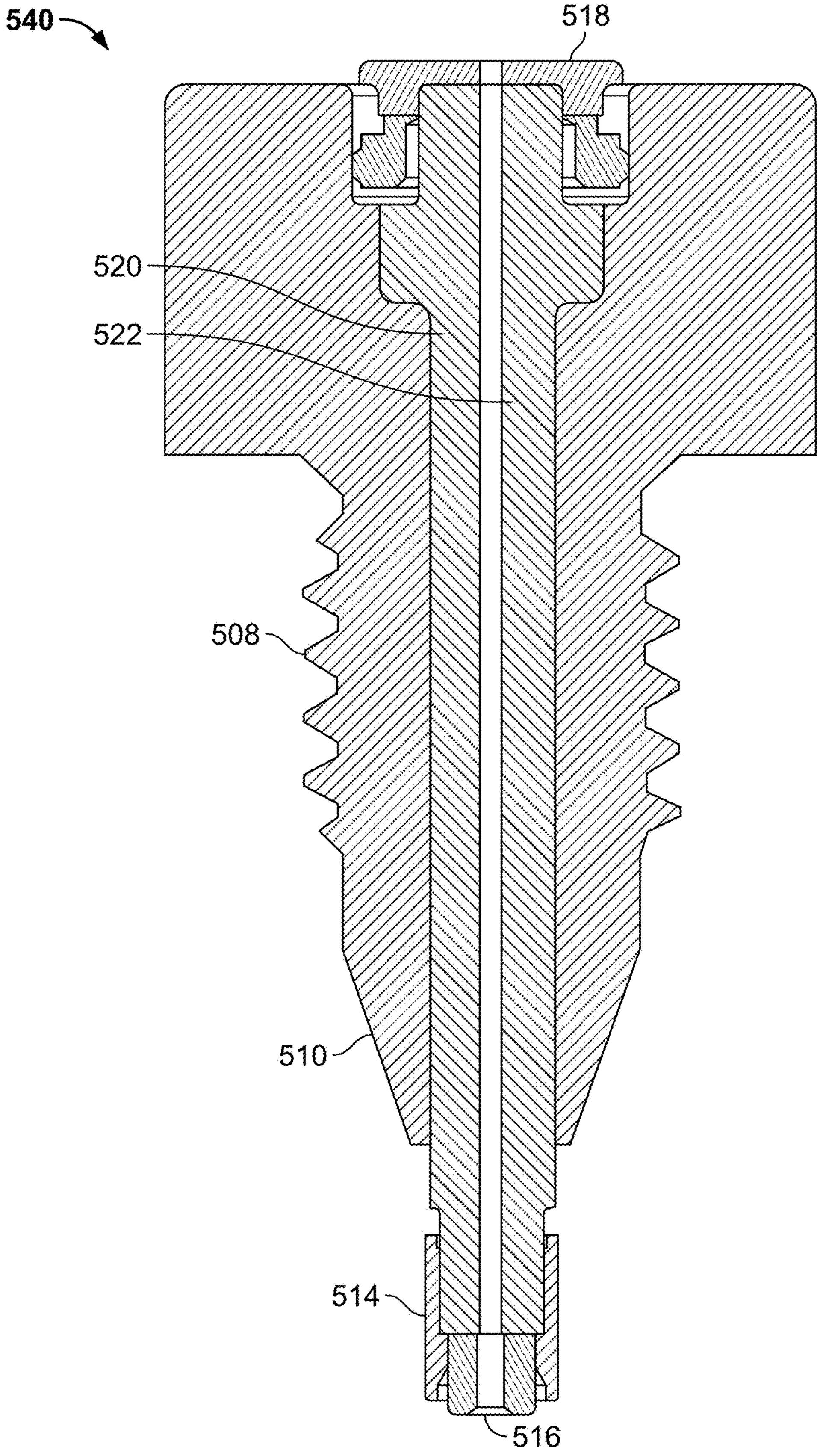
FIG. 5A depicts a cross-sectional view of an additional embodiment of the adapters without lock nuts for connection to a liquid chromatography column for exemplary embodiments.
Figure 5B:
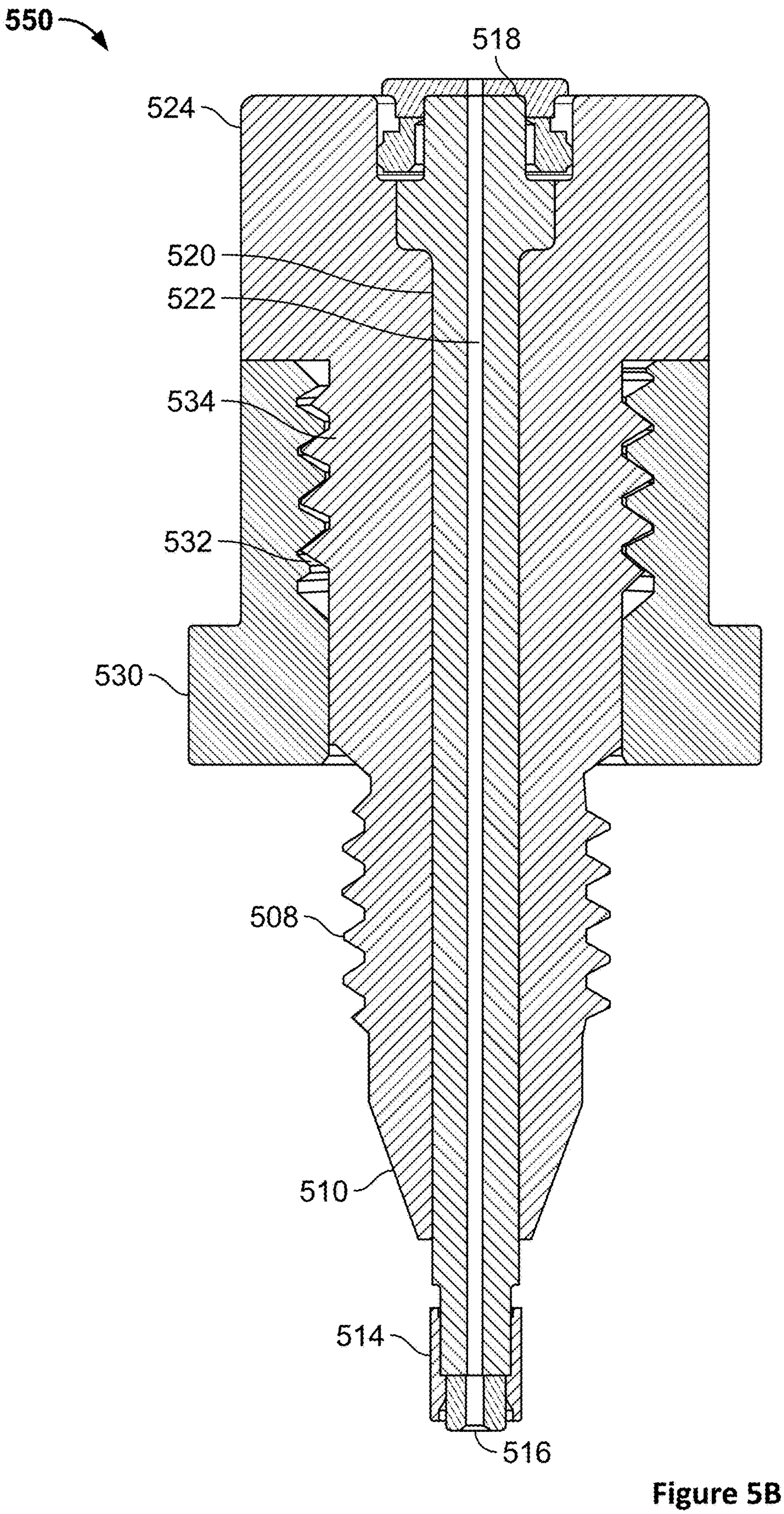
FIG. 5B depicts a cross-sectional view of an additional embodiment of the adapters with lock nuts for connection to a liquid chromatography column for exemplary embodiments.

FIGS. 5A and 5B depict cross-sectional views of adapters 540 and 550, that differ as to the tube design from the adapters described above. The tube 420 may be inserted into the adapter body during manufacture. The adapters shown in 540 lack a lock nut. The adapter 550, shown in FIG. 5B has a lock nut. The adapters 540, 550, may include external threads 508, tapered sections 510, collars 514 for retaining the distal face seals 516, proximal face seals 518, distal face seals and bores or lumens 522 as described above. Adapter 550 has a lock nut 530 with threads 532 and internal threads 534 on the axially extending body of the adapter 550.

Figure 6:
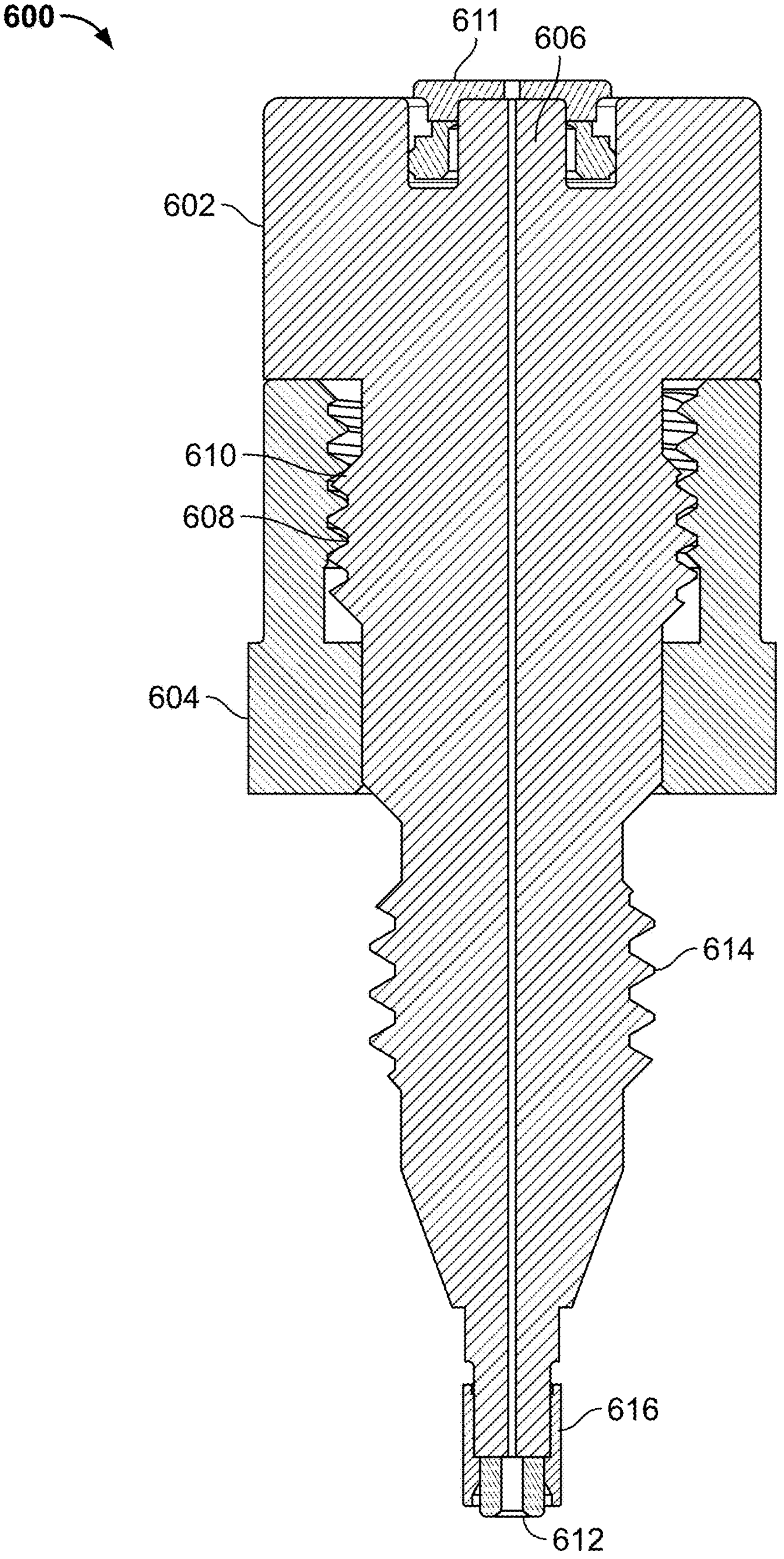
FIG. 6 depicts a cross-sectional view of an additional embodiment of the adapters that uses a solid body for exemplary embodiments.

The adapter also may be formed as a solid as a solid structure. FIG. 6 depicts an illustrative adapter 600 that is a solid structure. There is no tube (such as tube 420 in FIG. 4A) that is inserted into the interior of the adapter during assembly. The solid adapter 600 has fewer parts than those that include the tube and as a result, may be cheaper to manufacture and assemble. In the adapter 600, a lumen 606 is formed in the solid body of the adapter 600. In other respects, the adapter may be like the previously described adapters of FIGS. 4A-5B. The adapter 600 has a head portion 602 and a lock nut 604. The lock nut 604 includes threads 608 that mate with threads 610 of the adapter body. The adapter 600 includes a proximal face seal 611 and a distal face seal 612. A retainer retains the distal face seal 612. The adapter body includes threads for securing the adapter 600 to an end nut that has corresponding threads.

Figure 7:
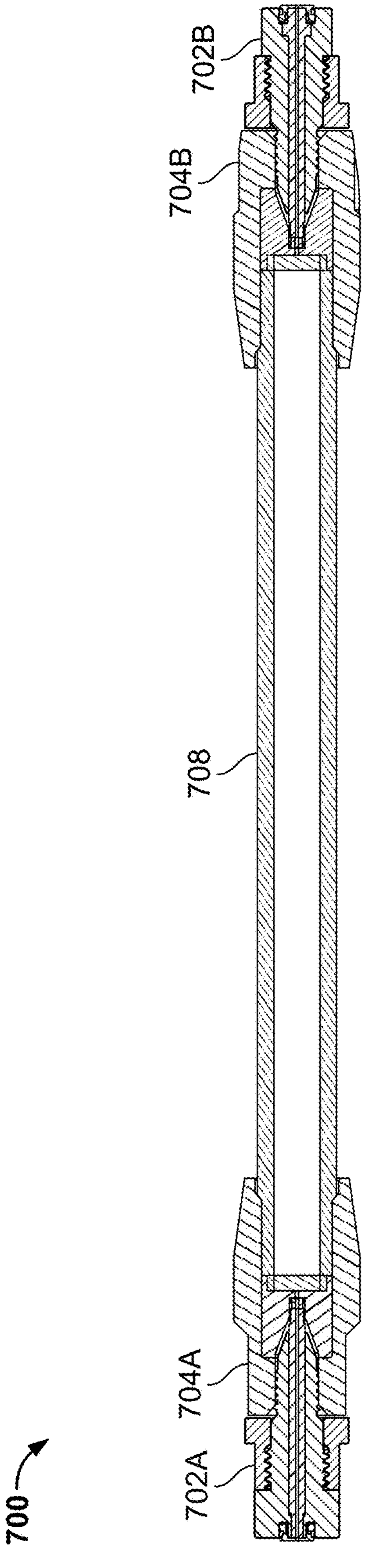
FIG. 7 depicts an illustrative liquid chromatography column assembly for an exemplary embodiment.

FIG. 7 depicts an illustrative liquid chromatography assembly 700 for exemplary embodiments. The liquid chromatography assembly 700 includes an adapter 702A that is engaged with an column end nut 704A, of the column 708. The other end of the liquid chromatography column 708 includes an column end nut 704B. An adapter 702B is engaged with the column end nut 704B. The lock nuts of the adapter 702A and the adapter 702B have been rotated to secure the adapters 702A, 702B to respective column end nuts 704A, 704B. The illustrative liquid chromatography assembly 700 may be used with a clamping fluidic connector to connect the liquid chromatography column 708 with other components of a chromatography system, such as a detector, a valve, a source of mobile phase or a sample injector, for example.

Figure 8A:
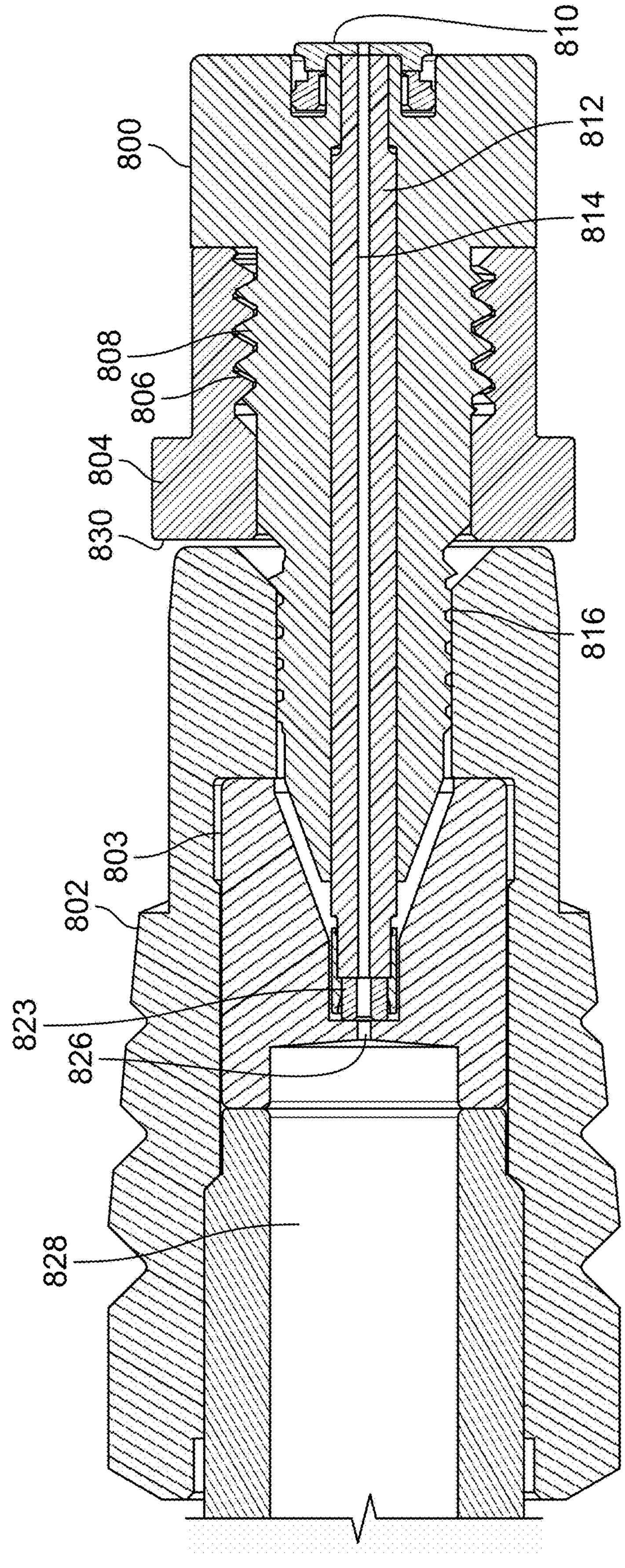
FIG. 8A depicts the interface of an adapter with a column end fitting and an receiver prior to rotating a lock nut in an exemplary embodiment to secure the connection.

FIG. 8A depicts an illustrative arrangement in which an adapter 800 is interfaced with an column end nut 802 and a receiver 803. The adapter 800 includes proximal face seal 810 and distal face seal 823. The adapter 800 includes an internal tube 812 with a bore or lumen 814 for carrying fluid. A lock nut 804 includes threads 806 that engage with threads 808 on an axially extending portion of the body of the adapter. External threads 816 may engage with corresponding threads of the column end nut 802 A channel 826 provides a fluidic connection with the liquid chromatography column 828.

Figure 8B:
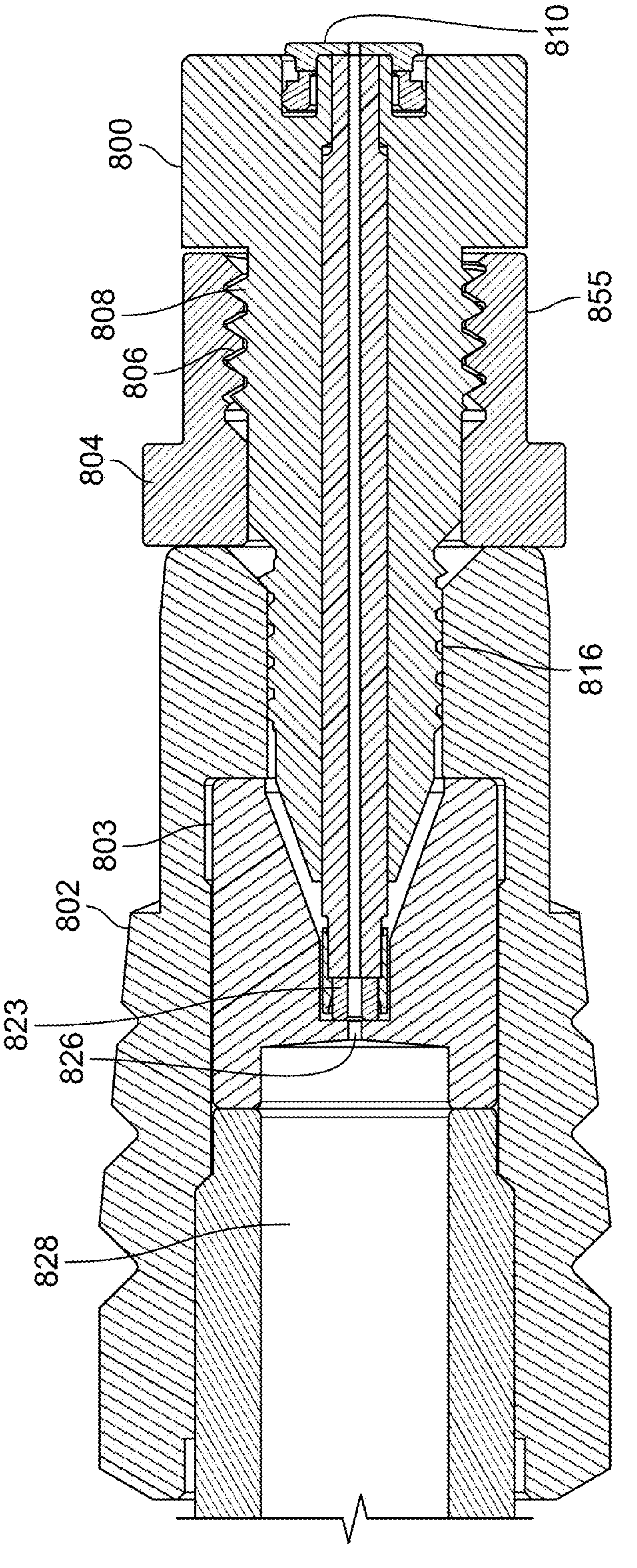
FIG. 8B depicts the interface of an adapter with a column end fitting and an receiver after rotating a lock nut to secure the connection in an exemplary embodiment.

The following describes a gap before and after tightening the lock nut. In FIG. 8A the lock nut 804 has not been fully rotated to secure the adapter 800 to the column end nut 802. There is a gap 830 between the adapter 800 and the column end nut 802. FIG. 8B depicts the adapter 800, column end nut 802, after the lock nut 804 has been rotated to secure the adapter 800 to the column end nut. The gap 830 (FIG. 8A) between the adapter 800 and the column end nut 802 is gone in FIG. 8B. In FIG. 8B, there is a gap 855 between the head portion of the adapter 800 and the lock nut 804 that results from the rotating (tightening) of the lock nut 804.

Figure 9:
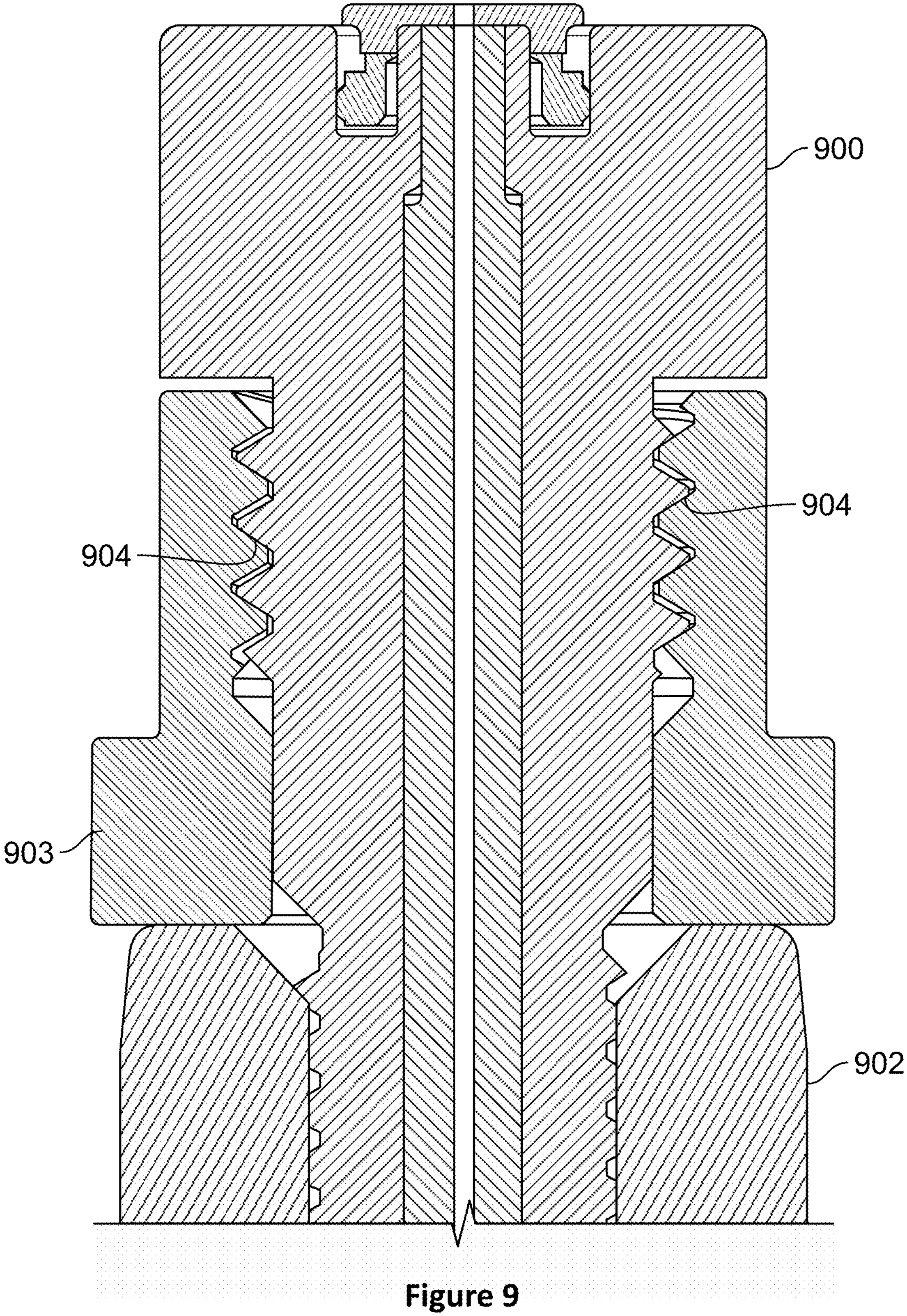
FIG. 9 depicts how threads of a lock nut of an adapter serves as load bearing surfaces in exemplary embodiments.

One benefit of the exemplary embodiments is that they may distribute the load that might otherwise be borne by the liquid chromatography column end nut 902 to the threads 904 of the lock nut 903 of the adapter 900 as shown in FIG. 9. The lock nut 903 controls the load on the face seal at the adapter to column end nut interface. This helps prevent wear and tear on the column end nut 902 of the liquid chromatography column and helps to prevent damage to the column end nut 902. If the adapter 900 becomes damaged, it is much cheaper to replace the adapter 900 than the entire liquid chromatography column.

Figure 10A:
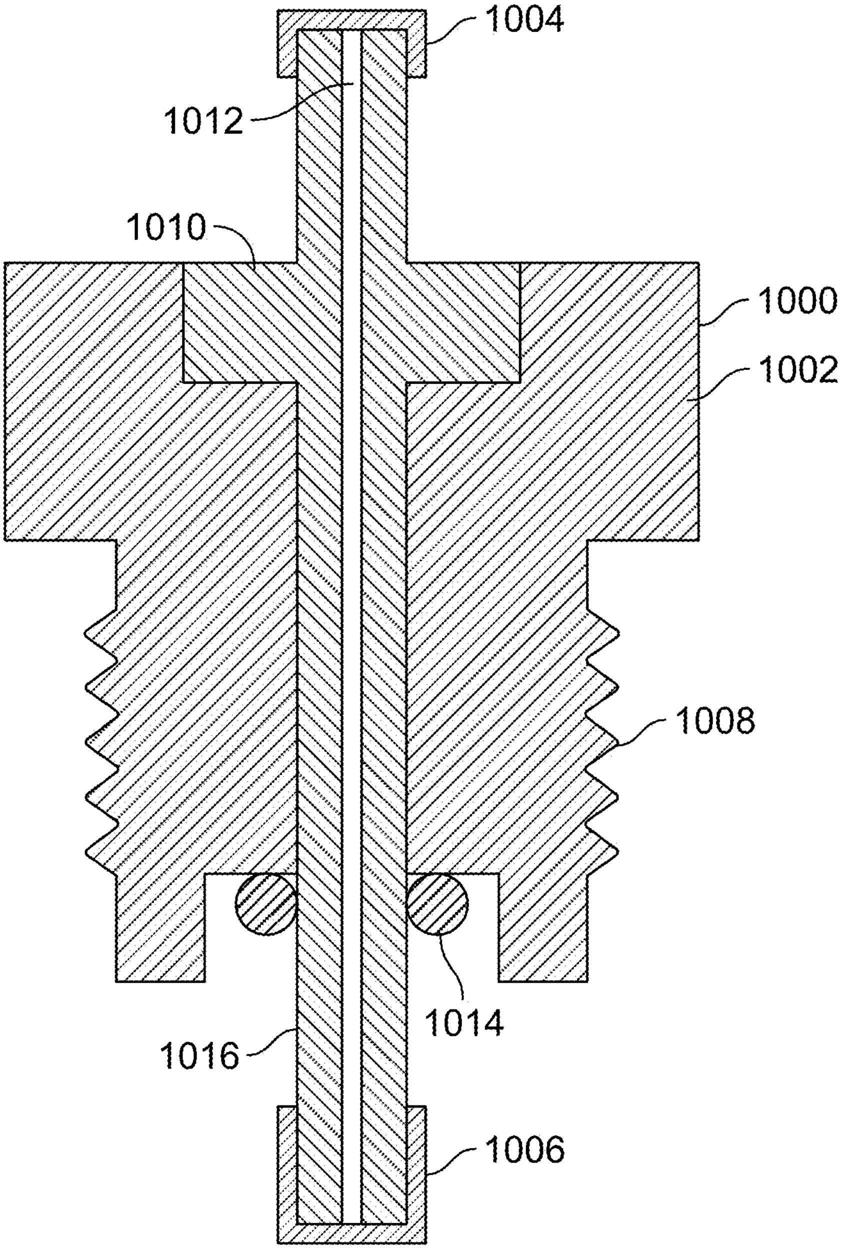
FIGS. 10A and 10B depict alternate adapter embodiments that do not have a conical section.

FIG. 10A depicts an alternate adapter 1000 of an exemplary embodiments that does not have a conical section. The adapter 1000 has proximal face seal 1004 and a distal face seal 1006. A tube 1010 extends from the proximal face seal to the distal face seal 1006. The tube 1010 includes an internal bore or lumen 1012 for carrying fluid. The adapter 1000 has a head portion 1002 without a lock nut. The axially extending body of the adapter 1000 includes external threads 1008 for engaging with corresponding threads of an column end nut. A retainer 1014 is provided beneath the threaded portion. A cylindrical neck 1016 extends to the distal end of the adapter 1000.

Figure 10B:
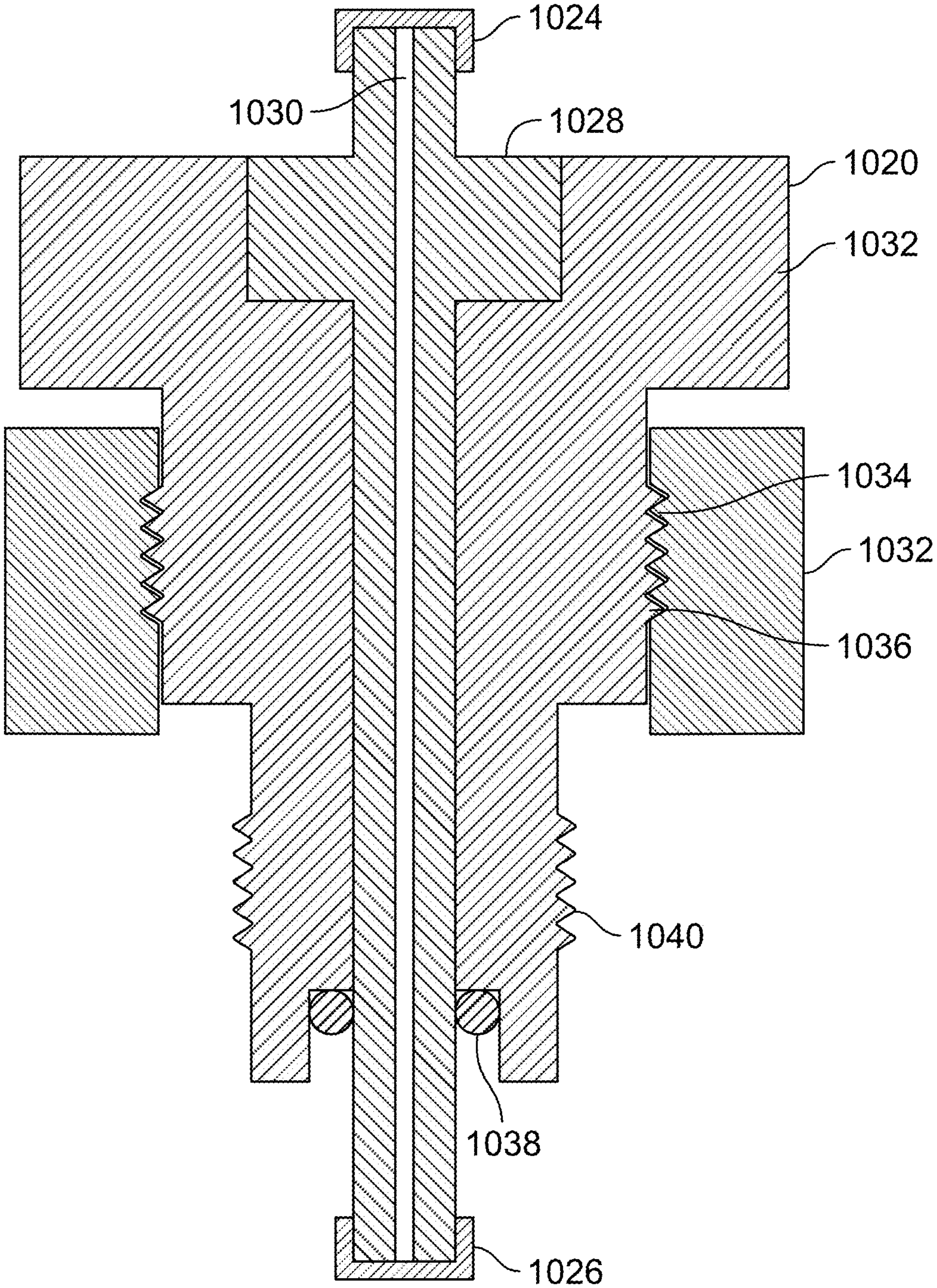

FIG. 10B depicts a corresponding adapter 1020 with a lock nut 1032. The adapter 1020 include a proximal face seal 1024 and a distal face seal 1026. The adapter 1020 has a tube 1028 and bore or lumen 1030 for carrying fluid. The head 1022 of the adapter 1020 includes lock nut 1032. The lock nut 1032 has threads 1034 that engage with threads 1036 of the adapter 1030. The lock nut 1032 may be rotated to secure the adapter 1020 to a column end nut. The adapter 1020 also includes external threads for mating with corresponding threads in the column end nut. A retainer 1038 is provided.

Figure 11:
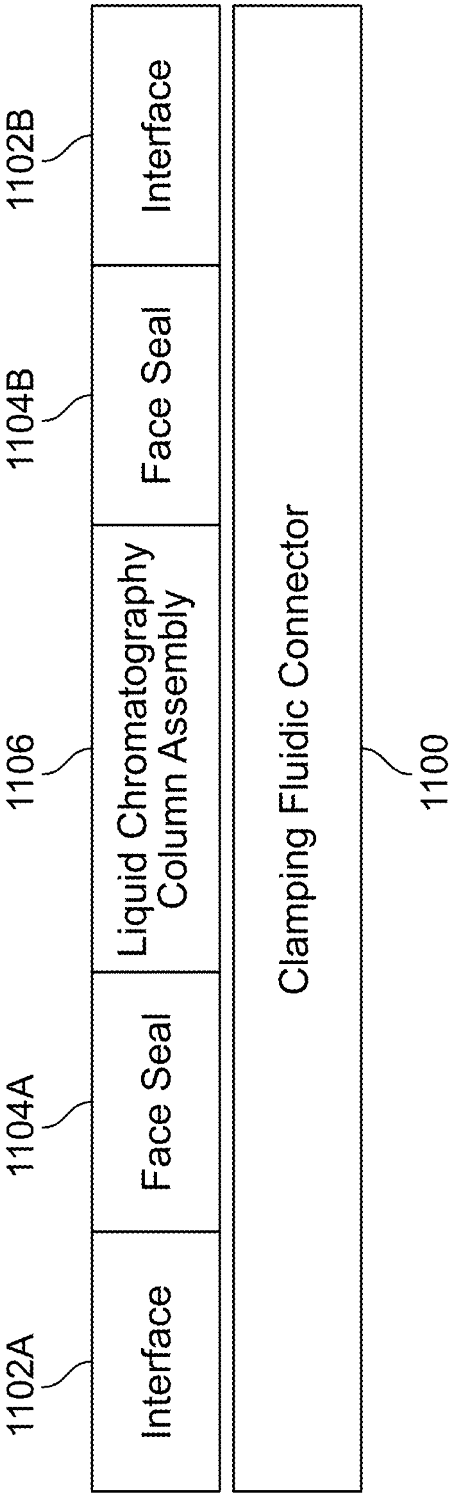
FIG. 11 depicts a diagram of a clamping fluidic connector interface with the face seals of adapters in a liquid chromatography column assembly.

FIG. 11 depicts a diagram illustrating how the clamping fluidic connector 1100 may hold the liquid chromatography column assembly to create fluidic connections. The clamping fluidic connector 1100 clamps onto the two ends of the liquid chromatography column assembly 1106. The clamping fluidic connector includes a mechanical interface 1102A that interfaces with face seal 1104A to create a fluidic connection and a mechanical interface 1102B that creates a mechanical connection with face seal 1104B to create a fluidic connection. The clamping fluid connector may be like that described in U.S. Pat. No. 10,338,038 or U.S. Patent Application Publication No. US20210341437 A1, both of which are assigned to Waters Technologies Corporation. These clamping fluidic connectors may need to be modified to accommodate the dimensions and design of the adapters rather than the column end fittings.

While exemplary embodiments have been described herein, various changes in form and detail may be made without departing from the intended scope of the appended claims.

The invention claimed is:

1. An adapter for a liquid chromatography column having a threaded column end fitting for adapting the liquid chromatography column to be connected with a connector, comprising:

an inner bore extending from a proximal end of the adapter to a distal end of the adapter;

a first face seal at the distal end of the adapter configured for interfacing with an inlet or an outlet of the liquid chromatography column;

a distal end of the adapter configured to mate with a column end fitting of the liquid chromatography column, the distal end including:

a first face seal at the distal end of the adapter configured for interfacing with an inlet or an outlet of the liquid chromatography column; and a second face seal at the proximal end of the adapter.

2. The adapter of claim 1, further comprising:

a head portion having threads; and a lock nut positioned over the threads for securing the adapter to the column end fitting of the liquid chromatography column.

3. The adapter of claim 1, further comprising a grip portion with a flange for abutting an end surface of the column end fitting.

4. The adapter of claim 1, further comprising threads on an outside of at least a portion of the distal end of the adapter for creating a force fit between the distal end of the adapter and the end nut.

5. The adapter of claim 1, wherein the connector is a clamping connector.

6. A liquid chromatography column assembly, comprising:

a liquid chromatography column;

a column end fitting on a first end of the liquid chromatography column; and an adapter for adapting the liquid chromatography column to be connected with a connector, the adapter comprising:

an inner bore extending from a proximal end of the adapter to a distal end of the adapter, a first face seal at the distal end of the adapter configured for interfacing with an inlet or an outlet of the liquid chromatography column, a distal end of the adapter configured to mate with an end nut of the liquid chromatography column, the distal end including, a first face seal at the distal end of the adapter configured for interfacing with an inlet or an outlet of the liquid chromatography column, and a second face seal at the proximal end of the adapter.

7. The liquid chromatography column assembly of claim 6, further comprising an additional column end fitting on a second end of the liquid chromatography column and an additional adapter positioned in the additional column end fitting.

8. The liquid chromatography column assembly of claim 6, wherein the column end fitting is a chromatography column end nut.

9. The liquid chromatography column assembly of claim 6, further comprising:

a head portion of the adapter having threads; and a lock nut positioned over the threads for securing the adapter to the column end fitting of the liquid chromatography column.

10. The liquid chromatography of claim 6, further comprising a grip portion with a flange for abutting an end surface of the end nut.

11. The liquid chromatography column assembly of claim 6, further comprising threads on an outside of at least a portion of the distal end of the adapter for creating a force fit between the distal end of the adapter and the end nut.

12. The liquid chromatography column assembly of claim 6, wherein the connector is a clamping connector.

13. A method of connecting an adapter having a proximal face seal and a distal face seal to a column end fitting of a liquid chromatography column having an inlet and an outlet, comprising:

mating a male connector of the adapter with a female connector of the column end fitting so that the distal face seal of the adapter is positioned at the inlet or the outlet of the liquid chromatography column and the proximal face seal remains exposed; and rotating a lock nut on the adapter over threads of the adapter against the column end fitting to secure the adapter to the column end fitting.

14. The method of claim 13, wherein the mating comprises positioning the male connector of the adapter in contact with the female connector of the column end fitting.

15. The method of claim 13, further comprising attaching the column end fitting to the liquid chromatography column.

* * * * *